United States Patent
Grelier et al.

(10) Patent No.: US 10,053,540 B2
(45) Date of Patent: *Aug. 21, 2018

(54) PHENOLIC POLYMERS AND PREPARATION PROCESSES THEREOF

(71) Applicants: UNIVERSITÉ DE BORDEAUX, Bordeaux (FR); INSTITUT POLYTECHNIQUE DE BORDEAUX, Talence (FR); Centre national de la recherche scientifique (C.N.R.S), Paris (FR)

(72) Inventors: Stéphane Grelier, Parentis-en born (FR); Henri Cramail, Sainte Terre (FR); Audrey Llevot, Bordeaux (FR); Stéphane Carlotti, Pessac (FR); Etienne Grau, Talence (FR)

(73) Assignees: UNIVERSITÉ DE BORDEAUX, Bordeaux (FR); INSTITUT POLYTECHNIQUE DE BORDEAUX, Talence (FR); CENTRE NATIONAL DE LA RECHERCHE SCIENTIFIQUE (C.N.R.S), Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/516,359

(22) PCT Filed: Oct. 10, 2015

(86) PCT No.: PCT/EP2015/072958
§ 371 (c)(1),
(2) Date: Mar. 31, 2017

(87) PCT Pub. No.: WO2016/050989
PCT Pub. Date: Apr. 7, 2016

(65) Prior Publication Data
US 2017/0260329 A1 Sep. 14, 2017

(30) Foreign Application Priority Data
Oct. 3, 2014 (EP) .................................... 14306563

(51) Int. Cl.
| | |
|---|---|
| *C08G 65/32* | (2006.01) |
| *C08F 283/00* | (2006.01) |
| *C08G 73/00* | (2006.01) |
| *C08G 63/193* | (2006.01) |
| *C08G 63/85* | (2006.01) |
| *C08G 63/672* | (2006.01) |
| *C08G 63/199* | (2006.01) |
| *C08G 63/547* | (2006.01) |
| *C08G 63/185* | (2006.01) |

(Continued)

(52) U.S. Cl.
CPC ............ *C08G 73/00* (2013.01); *C08F 112/34* (2013.01); *C08F 116/12* (2013.01); *C08F 118/12* (2013.01); *C08G 59/10* (2013.01); *C08G 63/185* (2013.01); *C08G 63/193* (2013.01); *C08G 63/199* (2013.01); *C08G 63/547* (2013.01); *C08G 63/672* (2013.01); *C08G 63/82* (2013.01); *C08G 63/83* (2013.01); *C08G 63/85* (2013.01); *C08G 69/26* (2013.01); *C08G 69/32* (2013.01)

(58) Field of Classification Search
CPC ...... C08G 73/00; C08G 63/85; C08G 63/672; C08G 63/199; C08G 63/547; C08G 63/185; C08G 63/83; C08G 63/82; C08G 63/193; C08G 69/26; C08G 69/32; C08G 59/10; C08F 118/12; C08F 116/12; C08F 112/34
USPC .................................................. 525/403, 523
See application file for complete search history.

(56) References Cited

U.S. PATENT DOCUMENTS

| | | | |
|---|---|---|---|
| 3,288,755 A | 11/1966 | Griehl | |
| 3,453,237 A | 7/1969 | Borden | |

(Continued)

FOREIGN PATENT DOCUMENTS

| | | |
|---|---|---|
| CH | 373401 | 11/1963 |
| CN | 103467726 | 12/2013 |

(Continued)

OTHER PUBLICATIONS

Amarasekara A. et at: "Vanillin based polymers:I. An electrochemical route to polyvanillin.", Green Chemistry, vol. 14, 2012, pp. 2395-2397, XP002737198, * figure 1 *, Jul. 5, 2012.
Amarasekata A. et al: "Vanillin-Based Polymers—part II", International Scholarly Reaearch Network, vol. 2012, Sep. 27, 2012(Sep. 27, 2012), pp. 1-5, XP002741962, * figure 1 *.
Database WPI Week 201431 Thomson Scientific, London, GB; AN 2014-D50996 XP002737199, & CN 103 467 726 A (Univ Nankai) Dec. 25, 2013 (Dec. 25, 2013) * abstract *.
Database WPI Week 197529 Thomson Scientific, London, GB; AN 1975-48437W XP002741963, & JP S50 24392 A (Agency of Ind Sci & Technology) Mar. 15, 1975 (Mar. 15, 1975) * abstract *.
Neda M et al: "High performance bio-based thermosetting resins based on bismaleimide and allyl-etherified eugenol derivatives.", Materials Chemistry and Physics, vol. 148, Aug. 26, 2014(Aug. 26, 2014), XP002741964, * figure 4 *.
European Search Report for EP14306563, completed Jul. 9, 2015.
International Search Report for PCT/EP2015/072958, completed Feb. 12, 2016.

*Primary Examiner* — William K Cheung
(74) *Attorney, Agent, or Firm* — B. Aaron Schulman, Esq.; Stites & Harbison, PLLC

(57) ABSTRACT

The present invention concerns the use of a compound having the following formula (I), for the preparation of a polymer. The present invention also concerns the polymers obtained from polymerization of compound of formula (I), and their processes of preparation.

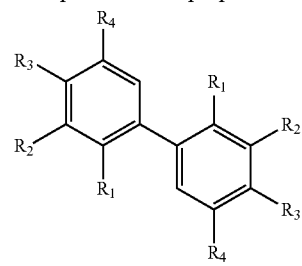

17 Claims, No Drawings

(51) Int. Cl.
    *C08G 63/83*     (2006.01)
    *C08G 63/82*     (2006.01)
    *C08G 69/26*     (2006.01)
    *C08G 69/32*     (2006.01)
    *C08G 59/10*     (2006.01)
    *C08F 116/12*     (2006.01)
    *C08F 112/34*     (2006.01)
    *C08F 118/12*     (2006.01)

(56) References Cited

U.S. PATENT DOCUMENTS

| | | | |
|---|---|---|---|
| 2005/0182203 A1* | 8/2005 | Sugano | C07C 261/02 |
| | | | 525/423 |
| 2012/0108763 A1 | 5/2012 | Vergelati | |
| 2013/0017397 A1 | 1/2013 | Kouda et al. | |
| 2015/0290239 A1 | 10/2015 | Lee et al. | |

FOREIGN PATENT DOCUMENTS

| | | |
|---|---|---|
| GB | 920520 | 3/1963 |
| JP | S5024392 | 3/1975 |

* cited by examiner

PHENOLIC POLYMERS AND PREPARATION PROCESSES THEREOF

This application is a § 371 National Stage Application of PCT International Application No. PCT/EP2015/072958, filed Oct. 5, 2015 claiming priority of European Patent Application No. 14306563.9, filed Oct. 3, 2014, the entire contents of each are incorporated by reference.

The present invention concerns the use of specific phenolic monomers for the preparation of polymers.

The present invention also relates to new phenolic polymers, in particular polyesters, polyamides, epoxy resins and unsaturated polyesters, and preparation processes thereof.

Aromatic compounds constitute basic chemicals to manufacture everyday life items. Indeed, they play a key role in pharmaceutical, perfumes, dyestuff and polymer industries. In plastic industry, aromatic units offer rigidity, hydrophobicity and fire resistance to the derived polymers. Aromatic polyesters, such as polyalkyleneterephtalate are widely commercially used, especially in food packaging and textile field due to their good thermomechanical properties. Aromatic polyamides, such as Kevlar constitute high performance polymers thanks to their high stability and rigidity. Finally, phenolic compounds constitute a widely used raw material. For instance, Bisphenol A is an important monomer for the synthesis of polycarbonates, epoxy resins and a popular plasticizer for thermoplastic polymers. These compounds are mainly petroleum based and derived from benzene, xylene and toluene.

Phenolic polymers are difficult to prepare as it is not easy to prepare appropriate monomers with a sufficient purity. The high purity of the monomers is a pre-requisite to the synthesis of high molar mass polymer.

The aim of the present invention is to provide new phenolic thermoplastic polymers for use in numerous applications, as fibers, films, foams, composites, adhesives, coatings, etc. . . . The latter exhibit high thermal stability, high glass transition temperature and high mechanical properties. In addition, the presence of remaining phenolic functions onto the polymer skeleton also brings other properties to these materials such as anti-bacterial activity.

The present invention relates to the use of a compound having the following formula (I):

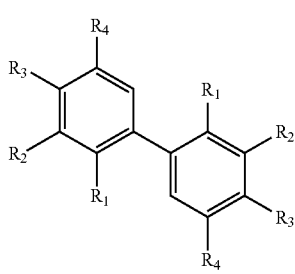

wherein:

$R_1$ is H or a $OR_7$ group, $R_7$ being H, a $(C_1-C_{10})$alkyl group or a $(C_2-C_6)$alkenyl group;

$R_2$ is a $(C_1-C_6)$alkoxy group;

$R_3$ is H or a radical of formula (II)

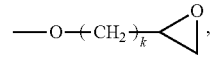

k being an integer varying from 1 to 6;

$R_4$ is a $(C_1-C_6)$alkoxy group or a radical X chosen from the group consisting of: $(C_2-C_6)$alkenyl groups, $(C_1-C_{10})$alkyl group, —CHO, —COOH, —CH$_2$OH, and —COOR$_a$, $R_a$ being a $(C_1-C_6)$alkyl group or a $(C_2-C_{12})$alkenyl group;

and wherein:

when $R_1$ is H, then $R_3$ is a group of formula (II) and $R_4$ is a $(C_1-C_6)$alkoxy group, and when $R_1$ is a $OR_7$ group, then $R_3$ is H and $R_4$ is X as defined above, for the preparation of a polymer.

The present invention is based on the fact that the compounds of formula (I) may be used as monomers suitable to be used for subsequent polymerization.

In one embodiment, the compound of formula (I) has one of the following formulae (I-1), (I-2), (I-3), (I-4), (I-5) or (I-6):

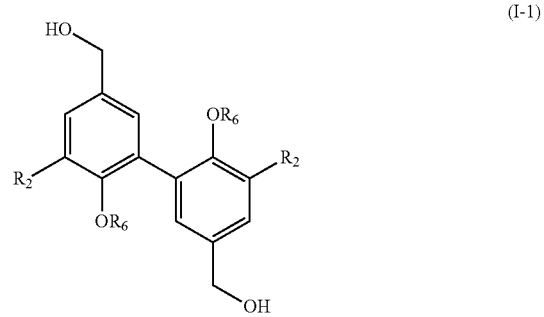

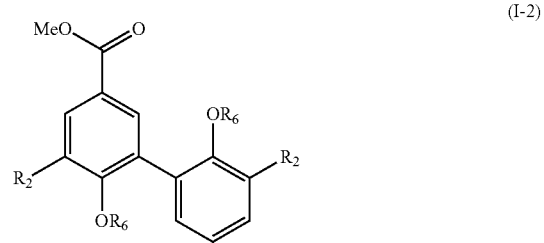

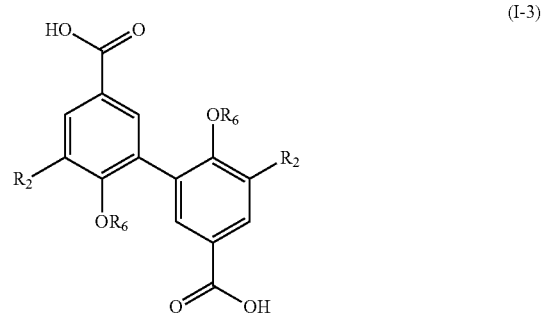

-continued

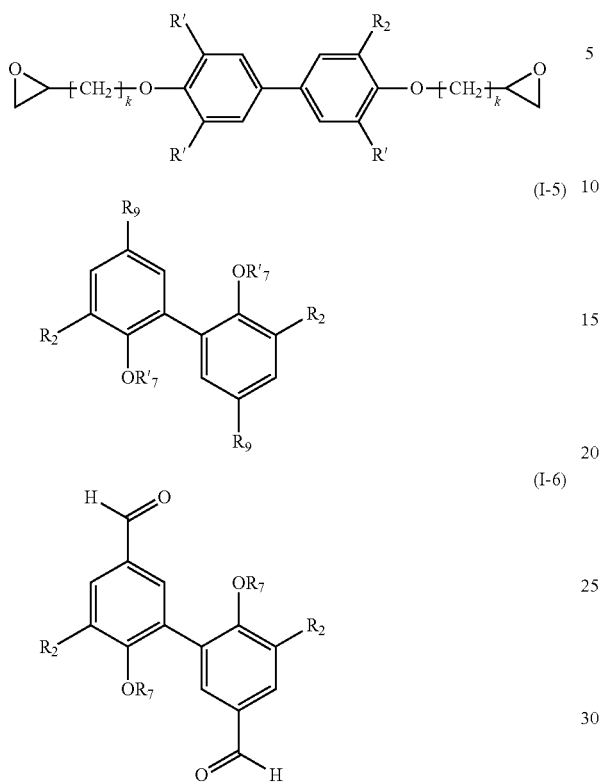

wherein:

$R_2$ and k are as defined above in formula (I),

R' is a $(C_1-C_6)$alkoxy group;

$R_6$ is a $(C_1-C_6)$alkyl group;

$R_7$ is as defined above in formula (I), preferably H;

$R'_7$ is chosen from the group consisting of: $(C_1-C_{10})$alkyl groups and $(C_2-C_6)$alkenyl groups, and $R_9$ is chosen from the group consisting of: $(C_1-C_{10})$alkyl groups, $(C_2-C_6)$alkenyl groups, and —$COOR_a$ groups, $R_a$ being a $(C_2-C_{12})$alkenyl group, wherein, when $R'_7$ is an alkyl group, then $R_9$ is chosen from the $(C_2-C_6)$ alkenyl groups and —$COOR_a$ groups, and when $R'_7$ is an alkenyl group, then $R_9$ is an alkyl group.

The present invention also relates to a polymer susceptible to be obtained by polymerization of the compound of formula (I) as defined above. Such polymer is obtained by implementing a polymerization step according to the polymerization methods well-known in the art of the compound of formula (I) as defined above.

The present invention also relates to a polymer susceptible to be obtained by polymerization of the compound of formula (I) as defined above, and of a monomer chosen from the group consisting of: diacids, diesters, diamines, and epoxy compounds.

In one embodiment, the diacids and the diesters are selected from the compounds having the following formula (V):

$$R_bOOC-A_1-COOR_b \quad (V)$$

wherein:

$R_b$ is H or $(C_1-C_6)$alkyl group; and $A_1$ is chosen from the group consisting of:
- a $(C_2-C_{10})$alkylene radical;
- a $(C_3-C_{12})$cycloalkylene radical, optionally substituted by at least one $(C_1-C_{10})$alkyl group;
- a $(C_2-C_{30})$alkenylene radical;
- an arylene radical comprising from 6 to 14 carbon atoms, optionally substituted in ortho, meta or para with a $(C_1-C_{10})$alkyl group;
- a heteroarylene radical comprising from 5 to 14 carbon atoms and at least one heteroatom chosen from O, S and N, optionally substituted in ortho, meta or para with a $(C_1-C_{10})$alkyl group; and
- a radical of formula —$B_1$—$B_2$—$B_3$— wherein:
  $B_2$ is a $(C_3-C_{12})$cycloalkylene radical, in which one or more carbon atom(s) is optionally substituted by at least one $(C_1-C_{10})$alkyl group, and
  $B_1$ and $B_3$, identical or different, are chosen from the $(C_2-C_{15})$alkylene radicals;
- a radical of formula —$B_4$—$B_5$—, wherein $B_4$ and $B_5$, identical or different, are chosen from the arylene radicals comprising from 6 to 14 carbon atoms, optionally substituted in ortho, meta or para with one or several substituents chosen from the $(C_1-C_6)$ alkoxy groups.

In one embodiment, the diamines are selected from the compounds having the following formula (VII):

$$H_2N-A_2-NH_2 \quad (VII)$$

wherein $A_2$ is chosen from the group consisting of:
- a $(C_2-C_{10})$alkylene radical;
- a $(C_3-C_{12})$cycloalkylene radical, optionally substituted by at least one $(C_1-C_{10})$alkyl group;
- a $(C_2-C_{30})$alkenylene radical;
- an arylene radical comprising from 6 to 14 carbon atoms, optionally substituted in ortho, meta or para with a $(C_1-C_{10})$alkyl group;
- a heteroarylene radical comprising from 5 to 14 carbon atoms and at least one heteroatom chosen from O, S, and N, optionally substituted in ortho, meta or para with a $(C_1-C_{10})$alkyl group; and
- a radical of formula —$B'_1$—$B'_2$—$B'_3$— wherein:
  $B'_2$ is a $(C_1-C_{10})$alkylene radical, and
  $B'_1$ and $B'_3$, identical or different, are chosen from the arylene radicals comprising from 6 to 14 carbon atoms, optionally substituted in ortho, meta or para with a $(C_1-C_{10})$alkyl group;

In another embodiment, the diamines are selected from the compounds having the following formula (X):

$$H_2N-A_3-NH_2 \quad (X)$$

wherein $A_3$ is a radical of formula —$B''_1$—$B''_2$— wherein:
$B''_1$ is a $(C_3-C_{12})$cycloalkylene radical, in which one or more carbon atom(s) is optionally substituted by at least one $(C_1-C_{10})$alkyl group, and
$B''_2$ is a $(C_1-C_{10})$alkylene radical.

The present invention also relates to a polymer susceptible to be obtained by polymerization of the compound of formula (I) as defined above, comprising at least one repetitive unit U, said unit U comprising a moiety having the following formula (III):

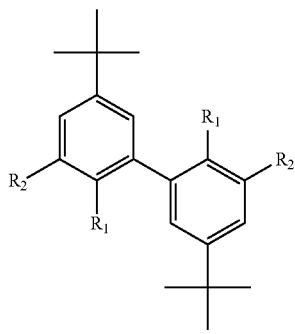

(III)

wherein:
R₁ represents $OR_7$ group, $R_7$ being H or a $(C_1$-$C_{10})$alkyl group; and
R₂ represents a $(C_1$-$C_6)$alkoxy group.

The repetitive unit U as defined above may comprise other moieties or other functional group(s) linked to the moiety of formula (III).

In one embodiment, in the formula (III) above-mentioned, $R_1$ and $R_2$, identical or different, are chosen from the $(C_1$-$C_6)$alkoxy groups. In particular, $R_1$ and $R_2$ represent a methoxy group.

In one embodiment, the present invention relates to a polymer as defined above comprising at least one repetitive unit U, wherein said unit U comprises a moiety having the formula (III-a):

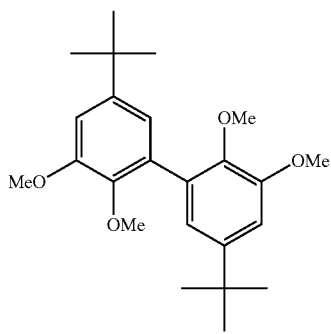

(III-a)

In one embodiment, the present invention relates to a polymer as defined above comprising at least one repetitive unit U, wherein said unit U comprises a moiety having the formula (III-b):

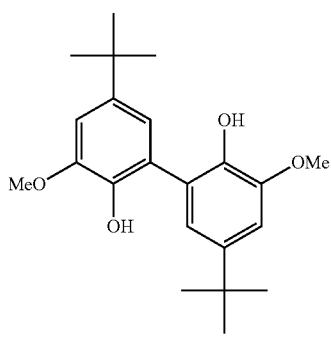

(III-b)

The present invention also relates to a compound having the following formula (IV):

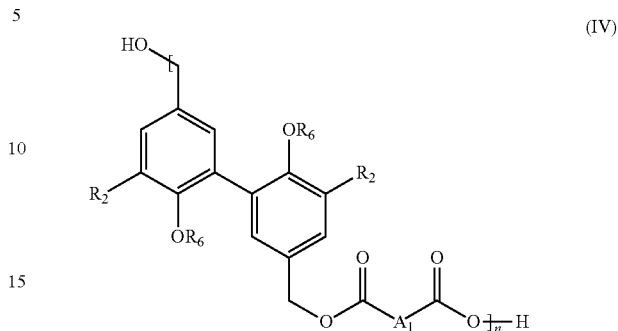

(IV)

wherein:
$A_1$ is as defined above in formula (V);
$R_2$ is a $(C_1$-$C_6)$alkoxy group;
$R_6$ is a $(C_1$-$C_6)$alkyl group; and According to a preferred embodiment, in formula (IV), n is greater than 2, preferably greater than 5, and in particular greater than 10.

The compounds of formula (IV) are compounds which are susceptible to be obtained by polymerization of a compound of formula (I) and a diacid or a diester.

In the compound having the formula (IV) as defined above, the repetitive unit U has the following formula (U-1):

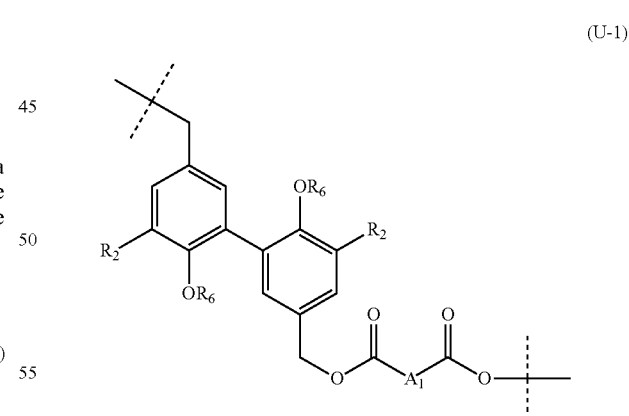

(U-1)

wherein $OR_6$ corresponds to the $R_1$ group of the moiety of formula (III), and $A_1$, $R_6$ and $R_2$ are as defined above.

In this compound, the repetitive units U comprise the moiety of formula (III) as defined above, which is linked on one side to a methylene radical and on the other side to a —CH₂—O—C(O)-$A_1$-C(O)—O— radical.

The compound of formula (IV) is a polymer which possesses n units U having the formula (U-1), which comprise the moiety of formula (III-1):

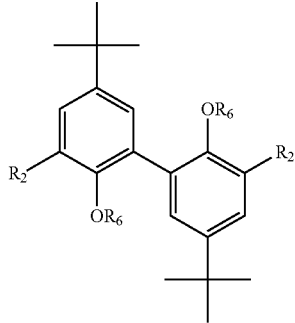
(III-1)

wherein $R_2$ and $R_6$ are as defined above.

As used herein, the bond wherein the sign ⌇ is present, means that said bond is linked to another moiety, for example another functional group.

For example, the polymer having the following formula (IV) may be written as follows:

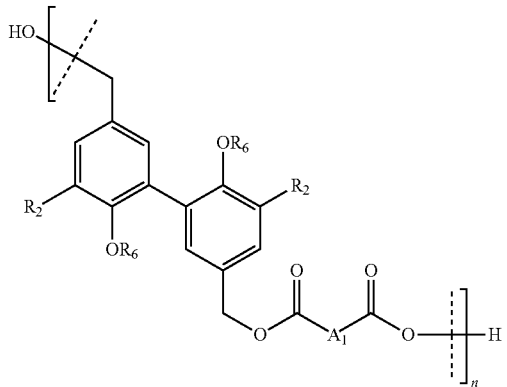
(IV)

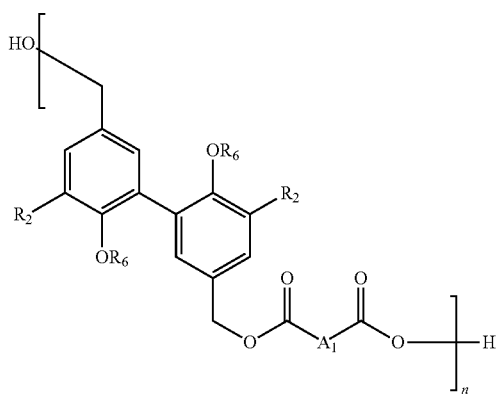

In one embodiment, in formula (IV), $R_2$ is a methoxy group.

In one embodiment, in formula (IV), $R_6$ is a methyl group.

In one embodiment, the present invention concerns a compound having the following formula (IV-1):

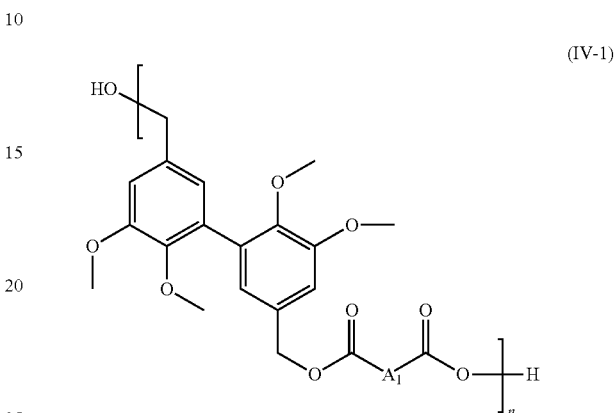
(IV-1)

wherein $A_1$ and n are as defined above.

In one embodiment, in formulae (IV) and (IV-1), $A_1$ is a $(C_2\text{-}C_{10})$alkylene radical, more particularly an octylene radical or an ethylene radical.

In one embodiment, in formulae (IV) and (IV-1), $A_1$ is a $(C_3\text{-}C_{12})$cycloalkylene radical, optionally substituted by at least one $(C_1\text{-}C_{10})$alkyl group.

In one embodiment, in formulae (IV) and (IV-1), $A_1$ is a $(C_2\text{-}C_{30})$alkenylene radical. In particular, $A_1$ represents —$(CH_2)_9$—CH=CH—$(CH_2)_9$— or —CH=CH—.

In one embodiment, in formulae (IV) and (IV-1), $A_1$ is an arylene radical comprising from 6 to 14 carbon atoms, optionally substituted in ortho, meta or para with a $(C_1\text{-}C_{10})$alkyl group. In particular, $A_1$ represents a phenylene radical.

In one embodiment, in formulae (IV) and (IV-1), $A_1$ is a heteroarylene radical comprising from 5 to 14 carbon atoms and at least one heteroatom chosen from O, S and N, optionally substituted in ortho, meta or para with a $(C_1\text{-}C_{10})$alkyl group.

In particular, $A_1$ represents:

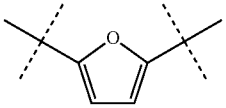

In one embodiment, in formulae (IV) and (IV-1), $A_1$ is a radical of formula —$B_1$—$B_2$—$B_3$— wherein:

$B_2$ is a $(C_3\text{-}C_{12})$cycloalkylene radical, in which one or more carbon atom(s) is substituted by at least one $(C_1\text{-}C_{10})$alkyl group, and $B_1$ and $B_3$, identical or different, are chosen from the $(C_8\text{-}C_{12})$alkylene radicals.

In particular, $A_1$ is:

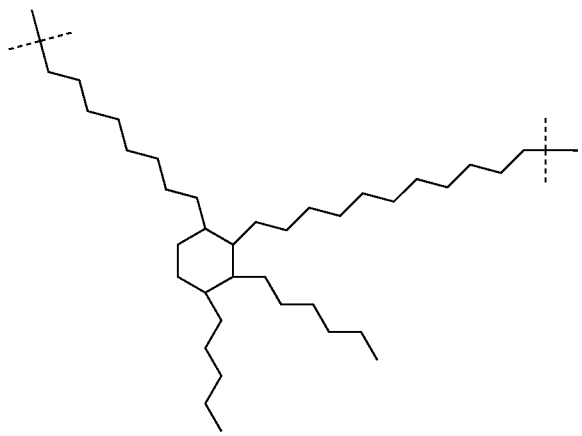

In one embodiment, in formulae (IV) and (IV-1), $A_1$ is a radical of formula —$B_4$—$B_5$—, wherein $B_4$ and $B_5$, identical or different, are chosen from the arylene radicals comprising from 6 to 14 carbon atoms, optionally substituted in ortho, meta or para with one or several substituents chosen from the ($C_1$-$C_6$)alkoxy groups.

In particular, $A_1$ is:

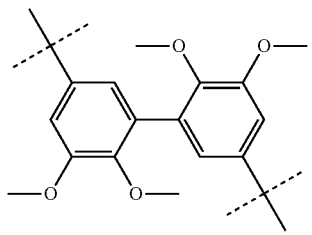

In one embodiment, in formulae (IV) and (IV-1), n is an integer varying from 2 to 130. According to a preferred embodiment, in formula (IV) or (IV-1), n is greater than 5, and in particular greater than 10.

The present invention also concerns a process for preparing a compound having formula (IV) or (IV-1), said process comprising at least one step of polymerization of:

a compound having the following formula (I-1):

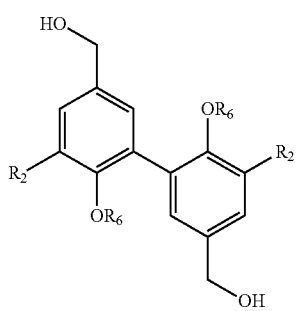

(I-1)

wherein $R_2$ and $R_6$ are as defined above, and a compound of formula (V) as defined above.

In one embodiment, the polymerization step is carried out in the presence of a catalyst chosen from the group consisting of: 5,7-triazabicyclo[4.4.0]dec-5-ene (TBD), zinc acetate (ZnAc), Ti(OBu)$_4$, dibutyl tin oxide (DBTO), and mixtures thereof.

In one embodiment, the polymerization step is carried out at a temperature comprised between 80° C. and 250° C., preferably between 120° C. and 200° C.

Typically, the catalyst may be used from 0.1% to 10% molar, preferably from 0.5% to 5% molar. Most preferably, the catalyst is Ti(OBu)$_4$, and is used at 0.5% molar.

In one embodiment, the compound having the following formula (I-1) has the following formula (I-1-1):

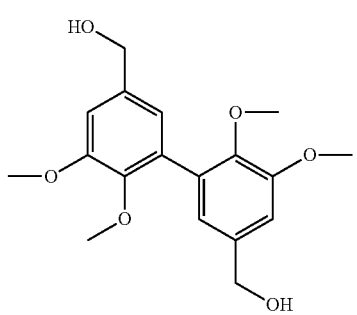

(I-1-1)

In another embodiment, the compound of formula (V) has the following formula (V-1):

HOOC-$A_1$-COOH (V-1)

wherein $A_1$ is as defined above.

In another embodiment, the compound of formula (V) has the following formula (V-2):

$R_b$OOC-$A_1$-COOR$_b$ (V-2)

wherein $A_1$ is as defined above, and $R_b$ is a ($C_1$-$C_6$)alkyl group.

In one embodiment, preferred compounds of formula (V-1) are chosen from the following compounds:
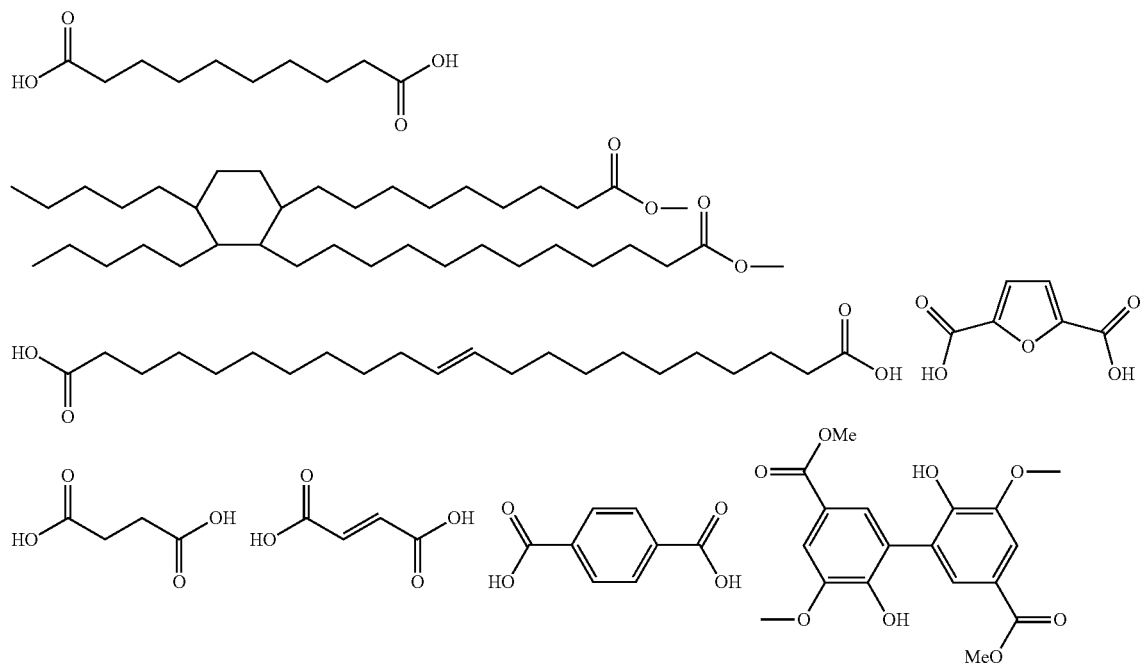
In one embodiment, preferred compounds of formula (V-2) are chosen from the following compounds:
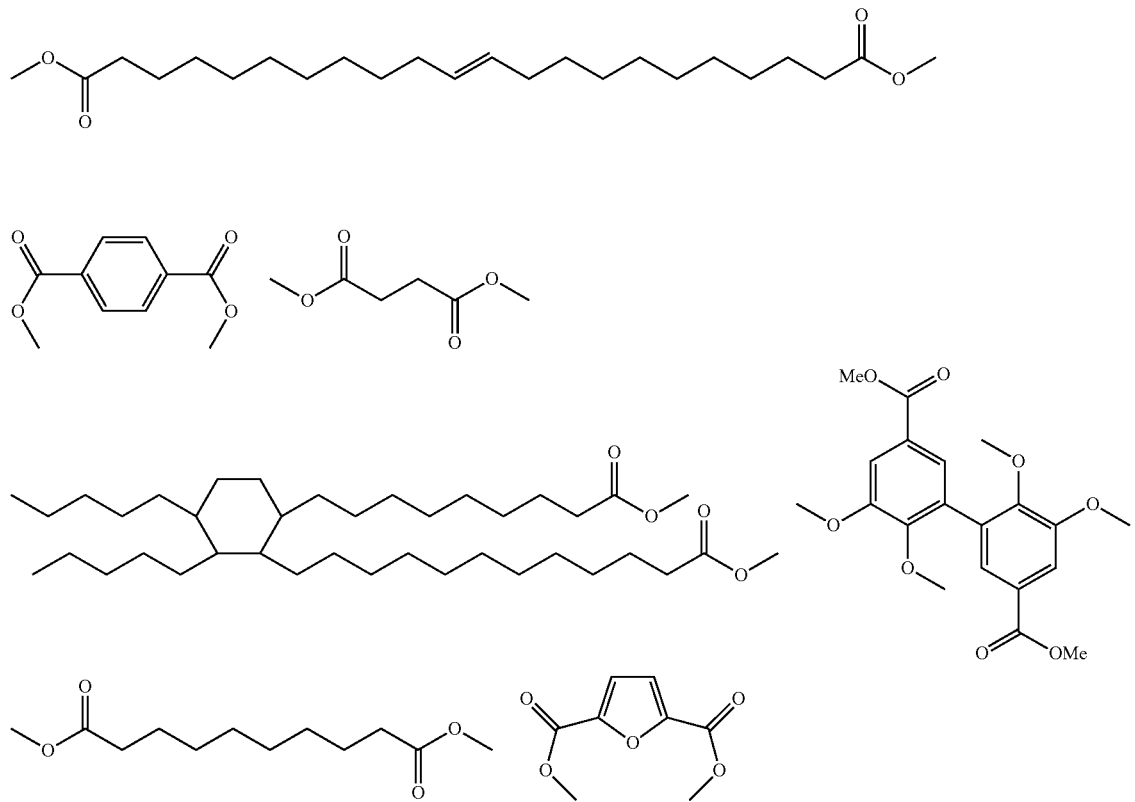

The present invention also relates to a compound having the following formula (IV-bis):

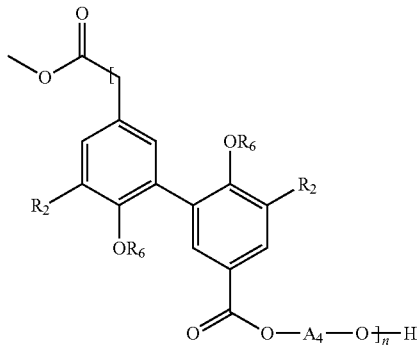

(IV-bis)

wherein:

$A_4$ is a $(C_2-C_{10})$alkylene radical;

$R_2$ is a $(C_1-C_6)$alkoxy group;

$R_6$ is a $(C_1-C_6)$alkyl group; and n is an integer varying from 1 to 40.

According to a preferred embodiment, in formula (IV-bis), n is greater than 2, preferably greater than 5, and in particular greater than 10.

The compounds of formula (IV-bis) are polymers which are susceptible to be obtained by polymerization of a compound of formula (I) and a diol.

In the compound having the formula (IV-bis) as defined above, the repetitive unit U has the following formula (U-2):

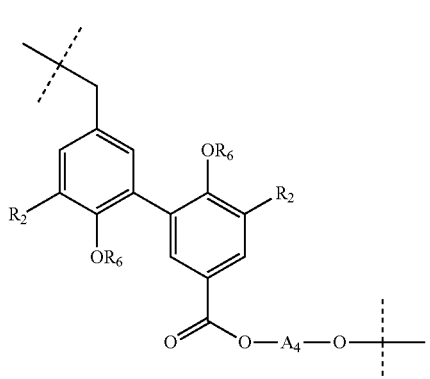

(U-2)

wherein $OR_6$ corresponds to the $R_1$ group of the moiety of formula (III), $A_4$, $R_6$ and $R_2$ being as defined above.

According to the invention, the compound of formula (IV-bis) is a polymer which possesses n units U having the formula (U-2), which comprise the moiety of formula (III-1):

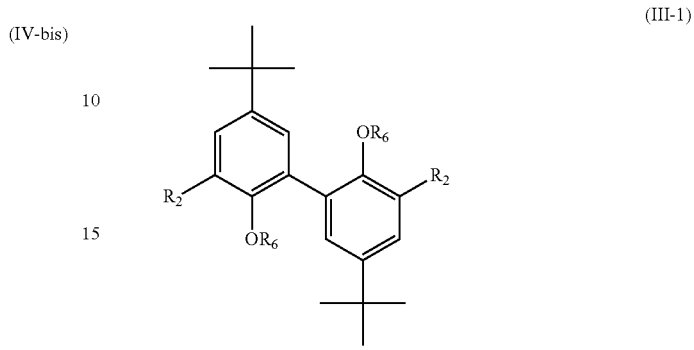

(III-1)

wherein $R_2$ and $R_6$ are as defined above.

In one embodiment, in formula (IV-bis), $R_2$ is a methoxy group.

In one embodiment, in formula (IV-bis), $R_6$ is a methyl group.

In one embodiment, the present invention relates to a compound having the following formula (IV-bis-1):

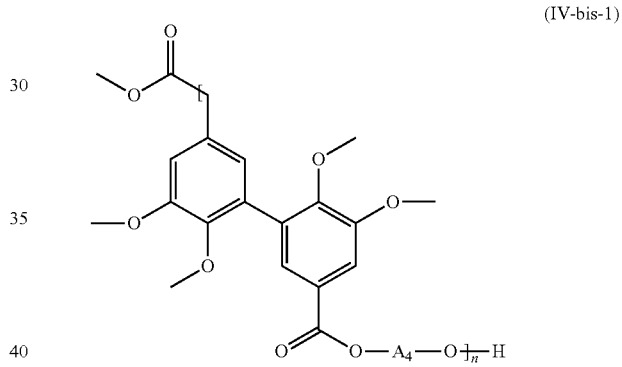

(IV-bis-1)

wherein $A_4$ and n are as defined above.

The compound of formula (IV-bis-1) corresponds to a polymer of formula (IV-bis) wherein: $R_2$ is methoxy and $R_6$ is methyl.

In one embodiment, in formulae (IV-bis) and (IV-bis-1), $A_4$ represents a decylene radical.

The present invention also concerns a process for preparing a compound having the formula (IV-bis) or (IV-bis-1) as defined above, comprising at least one step of polymerization of:

a compound having the following formula (I-2):

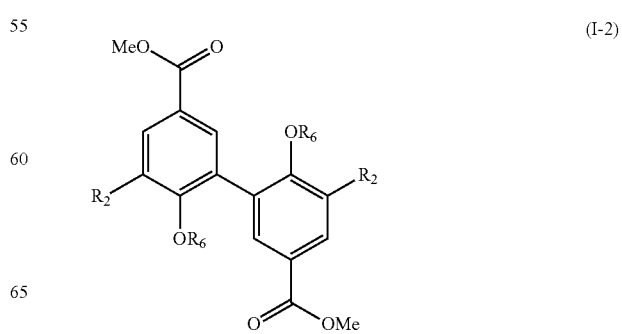

(I-2)

wherein $R_2$ and $R_6$ are as defined above,
and a compound of formula (VIII):

 (VIII)

wherein $A_4$ is as defined above.

In one embodiment, the polymerization step is carried out in the presence of a catalyst chosen from the group consisting of: 5,7-triazabicyclo[4.4.0]dec-5-ene (TBD), zinc acetate (ZnAc), Ti(OBu)$_4$, dibutyl tin oxide (DBTO), and mixtures thereof.

In one embodiment, the polymerization step is carried out at a temperature comprised between 80° C. and 250° C., preferably between 120° C. and 200° C.

Typically, the catalyst may be used from 0.1% to 10% molar, preferably from 0.5% to 5% molar. Most preferably, the catalyst is Ti(OBu)$_4$, and is used at 0.5% molar.

In one embodiment, the compound having the following formula (I-2) has the following formula (I-2-1):

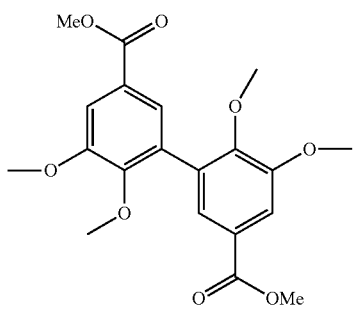 (I-2-1)

The compound of formula (I-2-1) corresponds to a compound of formula (I-2) wherein $R_2$ is methoxy and $R_6$ is methyl.

In another embodiment, the compound of formula (VIII) is:

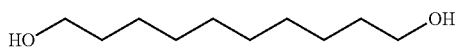 [SMILES: OCCCCCCCCCCO]

The present invention also relates to a compound having the following formula (VI):

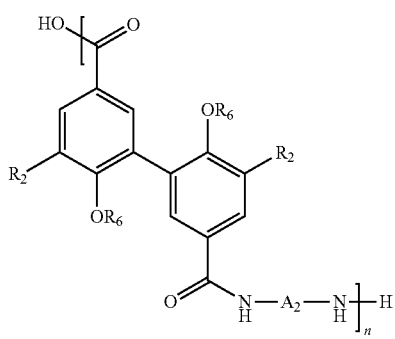 (VI)

wherein:
$A_2$ is as defined above in formula (VII);
$R_2$ is a (C$_1$-C$_6$)alkoxy group;
$R_6$ is a (C$_1$-C$_6$)alkyl group; and
n is an integer varying from 1 to 100.

According to a preferred embodiment, in formula (VI), n is greater than 2, preferably greater than 5, and in particular greater than 10.

The compounds of formula (VI) are polymers which are susceptible to be obtained by polymerization of a compound of formula (I) and a diamine.

In the polymer having the formula (VI) as defined above, the repetitive unit U has the following formula (U-3):

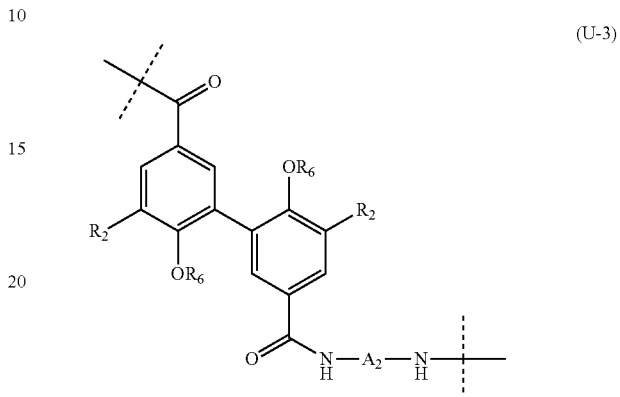 (U-3)

wherein $OR_6$ corresponds to the $R_1$ group of the moiety of formula (III), $A_2$, $R_6$ and $R_2$ being as defined above.

According to the invention, the polymer of formula (VI) possesses n units U having the formula (U-3), which comprise the moiety of formula (III-1):

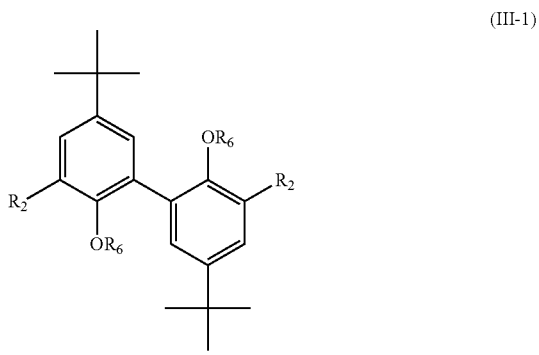 (III-1)

wherein $R_2$ and $R_6$ are as defined above.

In one embodiment, in formula (VI), $R_2$ is a methoxy group.

In one embodiment, in formula (VI), $R_6$ is a methyl group.

In one embodiment, the present invention relates to a polymer having the following formula (VI-1):

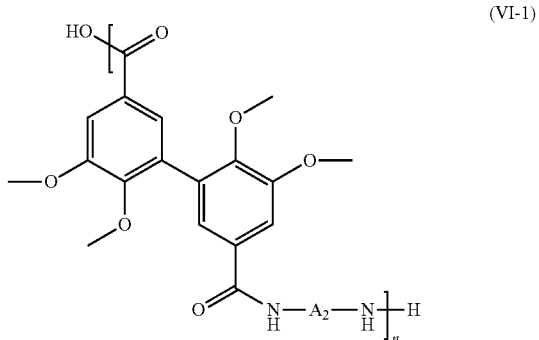 (VI-1)

wherein $A_2$ and n are as defined above.

The polymer of formula (VI-1) corresponds to a polymer of formula (VI) wherein $R_2$ is methoxy and $R_6$ is methyl.

The present invention also relates to a compound having the following formula (XII):

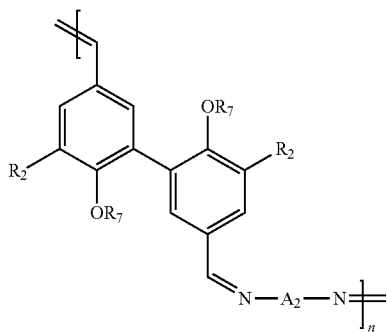

wherein:

$A_2$ is as defined above in formula (VII);

$R_7$ is as defined above in formula (I);

$R_2$ is a $(C_1-C_6)$alkoxy group; and n is an integer varying from 1 to 100.

According to a preferred embodiment, in formula (XII), n is greater than 2, preferably greater than 5, and in particular greater than 10.

The compounds of formula (XII) are polymers which are susceptible to be obtained by polymerization of a compound of formula (I-6) and a diamine.

According to the invention, the polymer of formula (VI) possesses n units U having the formula (U-3-1), which comprise the moiety of formula (III-1-1):

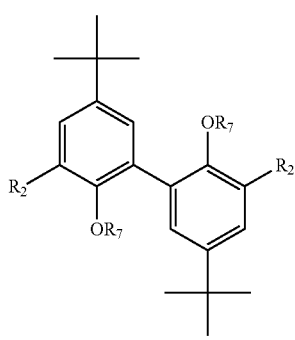

wherein $R_2$ and $R_7$ are as defined above.

In one embodiment, in formula (VI), $R_2$ is a methoxy group.

In one embodiment, in formula (VI), $R_7$ is H.

In one embodiment, in formulae (XII), (VI) and (VI-1), $A_2$ is a $(C_2-C_{10})$alkylene radical, more particularly a hexylene radical or a decylene radical.

In one embodiment, in formulae (XII), (VI) and (VI-1), $A_2$ is a $(C_3-C_{12})$cycloalkylene radical, optionally substituted by at least one $(C_1-C_{10})$alkyl group.

In one embodiment, in formulae (XII), (VI) and (VI-1), $A_2$ is a $(C_2-C_{30})$alkenylene radical.

In one embodiment, in formulae (XII), (VI) and (VI-1), $A_2$ is an arylene radical comprising from 6 to 14 carbon atoms, optionally substituted in ortho, meta or para with a $(C_1-C_{10})$alkyl group, in particular a phenylene.

In one embodiment, in formulae (XII), (VI) and (VI-1), $A_2$ is a heteroarylene radical comprising from 5 to 14 carbon atoms and at least one heteroatom chosen from O, S, and N, optionally substituted in ortho, meta or para with a $(C_1-C_{10})$alkyl group.

In one embodiment, in formulae (XII), (VI) and (VI-1), $A_2$ is a radical of formula —$B'_1$—$B'_2$—$B'_3$— wherein:

$B'_2$ is a $(C_1-C_{10})$alkylene radical, and $B'_1$ and $B'_3$, identical or different, are chosen from the arylene radicals comprising from 6 to 14 carbon atoms, optionally substituted in ortho, meta or para with a $(C_1-C_{10})$alkyl group.

In particular, $A_2$ is:

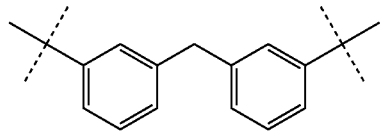

The present invention also relates to a process for preparing a polymer having the formulae (VI) or (VI-1) as defined above, comprising at least one step of polymerization of:

a compound having the following formula (I-3):

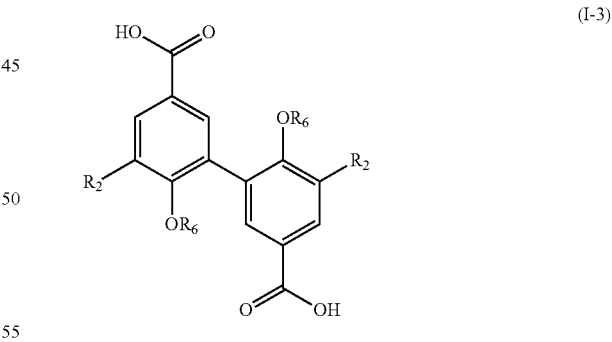

wherein $R_2$ and $R_6$ are as defined above, and a diamine of formula (VII) $H_2N-A_2-NH_2$, $A_2$ being as defined above.

In one embodiment, the polymerization step is carried out at a temperature comprised between 60° C. and 250° C., preferably between 80° C. and 240° C.

In one embodiment, the polymerization step is carried out in presence of an equimolar quantity of the compounds of formula (I-3) and the diamine of formula (VII).

In one embodiment, the compound having the following formula (I-3), used in the above-mentioned process, has the following formula (I-3-1):

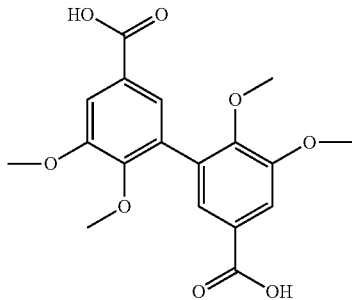

(I-3-1)

In another embodiment, the compound of formula (VII) has the following formula (VII-1):

$H_2N-(CH_2)_p-NH_2$ (VII-1)

wherein p is an integer comprised from 1 to 20, preferably from 2 to 12.

In an embodiment, the compound of formula (VII-1) is chosen from the following compounds:

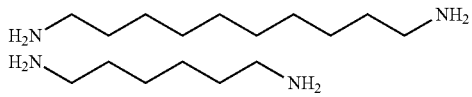

In another embodiment, the compound of formula (VII) has the following formula (VII-2):

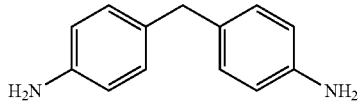

wherein q is an integer comprised from 1 to 20, preferably from 1 to 10.

In one embodiment, the compound of formula (VII-2) is as follows:

The present invention also relates to a process for preparing a polymer having the formulae (XII) as defined above, comprising at least one step of polymerization of a compound having the formula (I-6) as defined above, and a diamine of formula (VII) $H_2N-A_2-NH_2$, $A_2$ being as defined above.

The present invention also relates to a polymer having a repetitive unit comprising a moiety having the following formula (IX):

(IX)

wherein:

$R_2$ is as defined above, k is an integer varying from 1 to 6,

R' is a $(C_1-C_6)$alkoxy group, and $A_3$ is as defined above in formula (X).

The present invention also relates to the process for preparing a polymer comprising repetitive units containing a moiety having the formula (IX) as defined above, comprising at least one step of polymerization of:

a compound having the following formula (I-4):

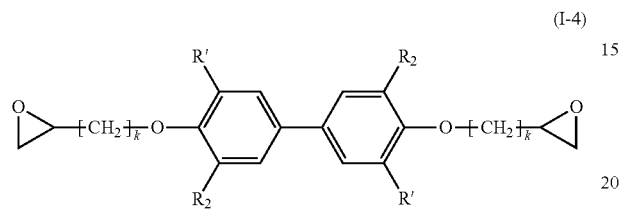

(I-4)

wherein:

$R_2$ is as defined above, k is an integer varying from 1 to 6,

R' is a $(C_1-C_6)$alkoxy group;

and a diamine of formula (X) $H_2N-A_3-NH_2$, $A_3$ being as defined above, $A_3$ being preferably a radical of formula $—B''_1—B''_2—$ wherein:

$B''_1$ is a $(C_3-C_{12})$cycloalkylene radical, in which one or more carbon atom(s) is optionally substituted by at least one $(C_1-C_{10})$alkyl group, and $B''_2$ is a $(C_1-C_{10})$alkylene radical.

In one embodiment, the polymerization step is carried out at a temperature comprised between 60° C. and 250° C., preferably between 80° C. and 200° C.

In the process of the invention, a preferred compound of formula (I-4) has the following formula (I-4-1):

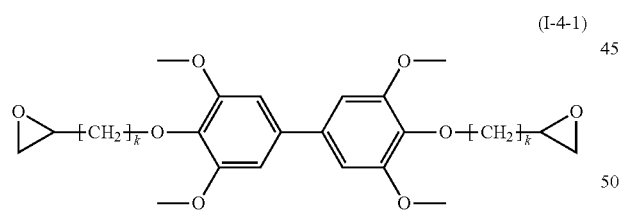

(I-4-1)

k being a defined above, such as for example the following compound:

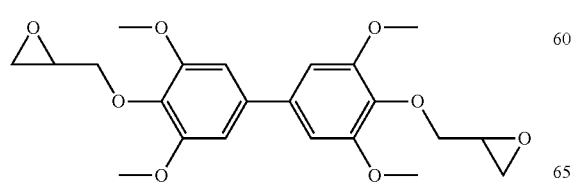

In the process of the invention, a preferred diamine of formula (X) has the following formula:

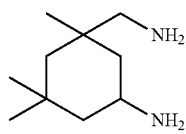

The present invention also relates to a compound having the following formula (XI-A) or (XI-B):

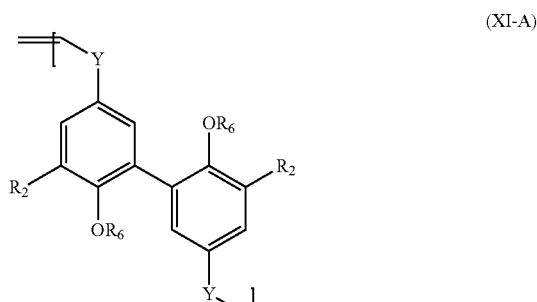

(XI-A)

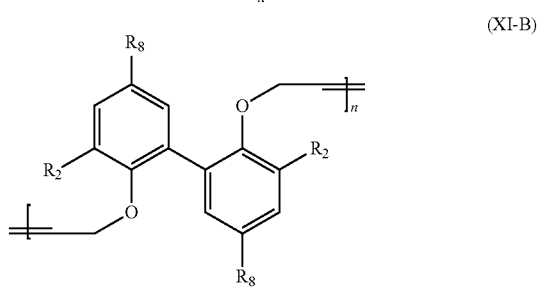

(XI-B)

wherein:

$R_2$ is a $(C_1-C_6)$alkoxy group;

$R_6$ is a $(C_1-C_{10})$alkyl group,

Y is chosen from the group consisting of: a bond, a $(C_1-C_{10})$alkylene group, $—C(O)O—R_c—$ and $—R_c—O(O)C$, $R_c$ being a $(C_1-C_{10})$alkylene radical;

$R_8$ is a $(C_1-C_6)$alkoxy group or a $(C_1-C_{10})$alkyl group; and n is an integer varying from 10 to 120.

In the compound having the formula (XI-A) as defined above, the repetitive unit U has the following formula (U-4):

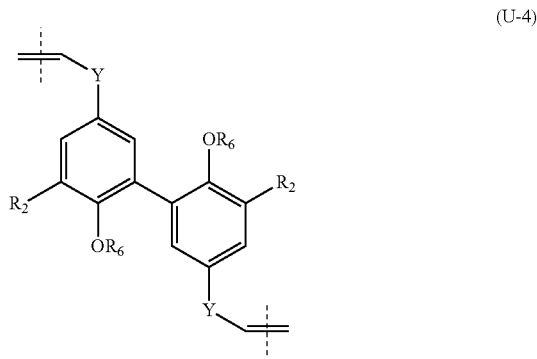

(U-4)

wherein $OR_6$ corresponds to the $R_1$ group of the moiety of formula (III), Y and $R_2$ being as defined above.

According to the invention, the compound of formula (XI-A) is a polymer which possesses n units U having the formula (U-4), which comprise the moiety of formula (III-1) as defined above.

In one embodiment, in formulae (XI-A) and (XI-B), $R_2$ is a methoxy group.

In one embodiment, in formulae (XI-A) and (XI-B), $R_6$ is a methyl group.

In one embodiment, in formulae (XI-A) and (XI-B), $R_8$ is a ($C_1$-$C_6$)alkoxy group, in particular a methoxy group.

In one embodiment, in formulae (XI-A) and (XI-B), $R_8$ is a ($C_1$-$C_{10}$)alkyl group, in particular a methyl group.

In one embodiment, the present invention relates to a polymer having the following formula (XI-A-1) or (XI-B-1):

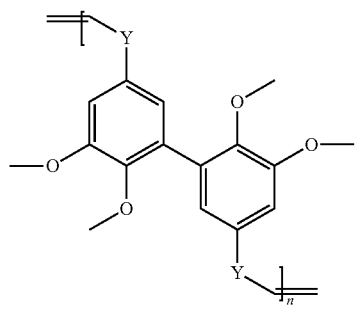

(XI-A-1)

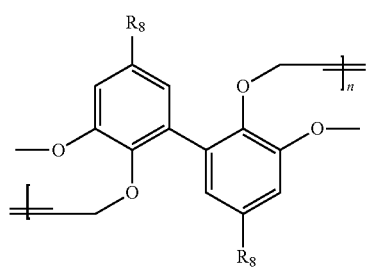

(XI-B-1)

wherein Y, $R_8$ and n are as defined above.

In one embodiment, in formulae (XI-A) and (XI-A-1), Y is a bond.

In one embodiment, in formulae (XI-A) and (XI-A-1), Y is a ($C_1$-$C_{10}$)alkylene group, in particular a methylene group.

In one embodiment, in formulae (XI-A) and (XI-A-1), Y is a radical —COO$R_c$— or —$R_c$OOC—, $R_c$ being as defined above and being in particular a nonylene radical.

In one embodiment, in formulae (XI-B) and (XI-B-1), $R_8$ is a ($C_1$-$C_{10}$)alkyl group, in particular a methyl group.

The present invention also relates to a process for preparing a compound having the formulae (XI-A) or (XI-B), comprising at least one step of polymerization of a compound having the following formula (I-5):

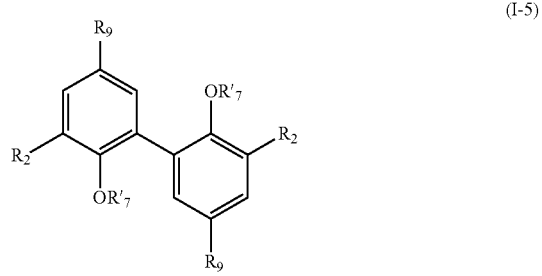

(I-5)

wherein:
$R_2$ is as defined above;
$R'_7$ is chosen from the group consisting of: ($C_1$-$C_{10}$)alkyl groups and ($C_2$-$C_6$)alkenyl groups, and
$R_9$ is chosen from the group consisting of: ($C_1$-$C_{10}$)alkyl groups, ($C_2$-$C_6$)alkenyl groups, and —COO$R_a$ groups, $R_a$ being a ($C_2$-$C_{12}$)alkenyl group, wherein, when $R'_7$ is an alkyl group, then $R_9$ is chosen from the ($C_2$-$C_6$) alkenyl groups and —COO$R_a$ groups, and when $R'_7$ is an alkenyl group, then $R_9$ is an alkyl group.

In one embodiment, the polymerization step is carried out in the presence of a Grubbs catalyst. These Grubbs catalysts are a series of transition metal carbene complexes used in particular as catalysts for olefin metathesis. The main advantage of these catalysts is their compatibility with different functional groups. The activity of these catalysts in acyclic diene metathesis polymerization (ADMET) has been widely demonstrated in a large number of publications. Such catalysts are well known from the skilled person.

Typically, the catalyst may be used from 0.1% to 10% molar, preferably from 0.5% to 5% molar. Most preferably, the catalyst is used at 2% molar.

In one embodiment, the polymerization step is carried out at a temperature comprised between 60° C. and 130° C., preferably between 80° C. and 120° C.

In one embodiment, in the formula (I-5) above-mentioned, $R_2$ is a methoxy group.

In the process of the invention, a preferred compound of formula (I-5) has the following formula (I-5-1):

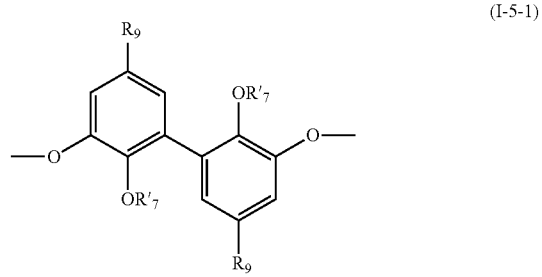

(I-5-1)

$R_9$ and $R'_7$ being a defined above.

In one embodiment, in formulae (I-5) and (I-5-1), $R'_7$ is a ($C_1$-$C_{10}$)alkyl group, in particular a methyl group.

In one embodiment, in formulae (I-5) and (I-5-1), $R'_7$ is a ($C_2$-$C_6$)alkenyl group, in particular a —$CH_2$—CH=$CH_2$ group.

In one embodiment, in formulae (I-5) and (I-5-1), $R_9$ is a ($C_2$-$C_6$)alkenyl group, in particular a —$CH_2$—CH=$CH_2$ group or a —CH=$CH_2$ group.

In one embodiment, in formulae (I-5) and (I-5-1), $R_9$ is a —COOR$_a$ group, in particular a —COO—(CH$_2$)$_9$—CH═CH$_2$ group.

Preferred compounds of formula (I-5) are chosen from the group consisting of:

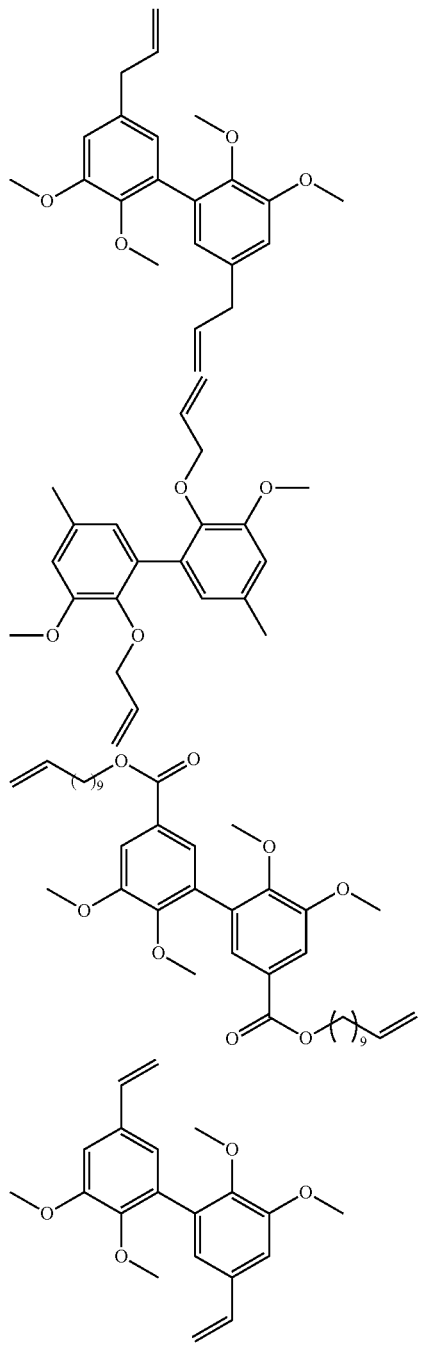

As used herein, the term "(C$_x$-C$_y$)alkyl" means a saturated aliphatic hydrocarbon group, which may be straight or branched, having x to y carbon atoms in the chain. Preferred alkyl groups have 1 to about 12, preferably 1 to 10, and more preferably 1 to 6, carbon atoms in the chain. The following alkyl groups may be cited as example: methyl, ethyl, propyl, butyl, pentyl, hexyl, heptyl, octyl, nonyl, decyl, dodecyl.

As used herein, the term "(C$_x$-C$_y$)alkylene" (or "alkylidene") refers to a divalent saturated aliphatic hydrocarbon radical, comprising from x to y carbon atoms, having preferably from 1 to 20, in particular 1 to 12 carbon atoms, and more preferably 2 to 10 carbon atoms. When said radical is linear, it may be represented by the formula (CH$_2$)$_m$ wherein m is an integer varying from 1 to 12, and preferably from 2 to 10. The following alkylene may be cited as example: methylene, ethylene, propylene, butylene, pentylene, hexylene, heptylene, octylene, nonylene, decylene, dodecylene.

As used herein, the term "(C$_x$-C$_y$)alkenyl" means an aliphatic hydrocarbon group containing a carbon-carbon double bond and which may be straight or branched having x to y carbon atoms in the chain. Preferred alkenyl groups have 2 to 12 carbon atoms in the chain; and more preferably about 2 to 10 or 2 to 6 carbon atoms in the chain. Exemplary alkenyl groups include for example ethenyl, propenyl, n-butenyl, i-butenyl, 3-methylbut-2-enyl, n-pentenyl, heptenyl, octenyl, nonenyl, decenyl.

As used herein, the term "alkenylene" means a hydrocarbon radical having at least one carbon-carbon double bond (straight chain or branched) wherein a hydrogen atom is removed from each of the terminal carbons such as ethenylene, propenylene, and the like.

As used herein, the term "(C$_x$-C$_y$)aryl" refers to an aromatic monocyclic or bicyclic hydrocarbon ring system having from x to y carbon atoms, preferably from 6 to 14, and more preferably 6 to 10, carbons atoms, wherein any ring atom capable of substitution may be substituted by a substituent. Examples of aryl moieties include, but are not limited to, phenyl, naphthyl, and anthracenyl.

As used herein, the term "arylene" refers to a radical derived from arene wherein two hydrogen atoms from the cycle have been deleted. Among the arylene radicals, the phenylene radical may be cited.

As used herein, the term "cycloalkyl" represents a non-aromatic monocyclic or bicyclic ring system having in particular from 3 to 12 carbon atoms. For example, cyclobutyl, cyclopentyl, cyclohexyl, cyclooctyl may be cited.

As used herein, the term "cycloalkylene" refers to a divalent, saturated or partially unsaturated, non-aromatic monocyclic, bicyclic ring system having in particular from 3 to 12 carbon atoms, such as cyclobutylene, cyclopentylene, cyclohexylene.

As used herein, the term "heteroaryl" means a 5- to 14-, preferably a 5- to 10-, membered aromatic or partially saturated hetero mono- or bi-cyclic ring which consists of from 1 to 4 heteroatoms independently selected from the group consisting of sulfur atoms, oxygen atoms and nitrogen atoms including, but not limited to, pyrazolyl, furyl, thienyl, oxazolyl, tetrazolyl, thiazolyl, imidazolyl, thiadiazolyl, pyridyl, pyrimidinyl, pyrrolyl, thiophenyl, pyrazinyl, pyridazinyl, isooxazolyl, isothiazolyl, triazolyl, furazanyl, indolinyl, benzothienyl, benzofuranyl, benzoimidazolinyl, quinolinyl, tetrahydroquinolinyl, and the like.

As used herein, the term "hereroarylene" refers to a divalent heteroaryl as defined above.

As used herein, the term "alkoxy" means an alkyl-O— group wherein the alkyl group is as herein described. Exemplary alkoxy groups include methoxy, ethoxy, n-propoxy, i-propoxy, n-butoxy and heptoxy.

As used herein, the compounds of the invention such as those having one of the formulae (IV), (IV-bis), (VI), (XI-A) or (XI-B), may also be named 'polymers', especially as they comprise the repetition of n repetitive units.

The invention is described in the foregoing by way of non-limiting examples.

EXAMPLES

Suppliers

Triazobycyclodecene, Zinc acetate, Dibutyltin oxide, Titanium butoxide, Grubbs $1^{st}$ generation catalyst, Grubbs $2^{nd}$ generation catalyst, Hoveyda Grubbs $1^{st}$ generation catalyst, Hoveyda Grubbs $2^{nd}$ generation catalyst, Succinic acid, Dimethyl succinate, Dimethyl terephthalate, 4,4'-methylene-dianiline were purchased at Sigmal Aldrich. Sebacic acid and 1,6-diaminohexane were bought at Alfa Aesar. 2,5-furandicarboxylic acid, 1,1-diaminodecane and dimethylsebacate were supplied by TCI. Polarclean (methyl-5-(dimethylamino)-2-methyl-5-oxopentanoate) and Pripol were respectively supplied at Solvay and Croda. Maleic acid, terephtalic acid and Isophorone diamine were respectively purchased at Merck, Prolabo and Fisher.

Example 1: Preparation of Polyesters (P1 to P8) by Esterification

General Procedure

Diol (1 equivalent) and diester (or diacid) (1 equivalent) were stirred at 160° C. for 2 h under nitrogen flow and at 200° C. under vacuum for 6 h in the presence of 0.5 mol % of titanium butoxide The following polymers were prepared according to this procedure:

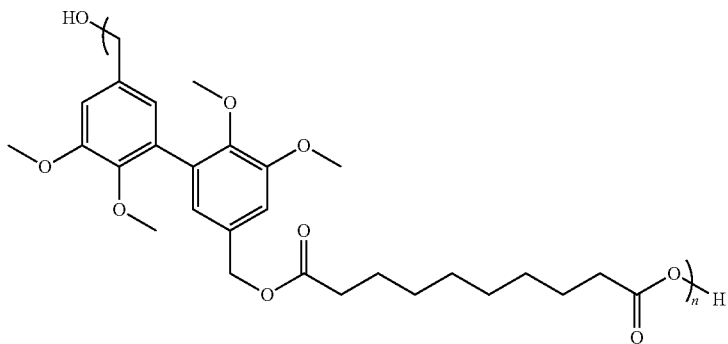

P1

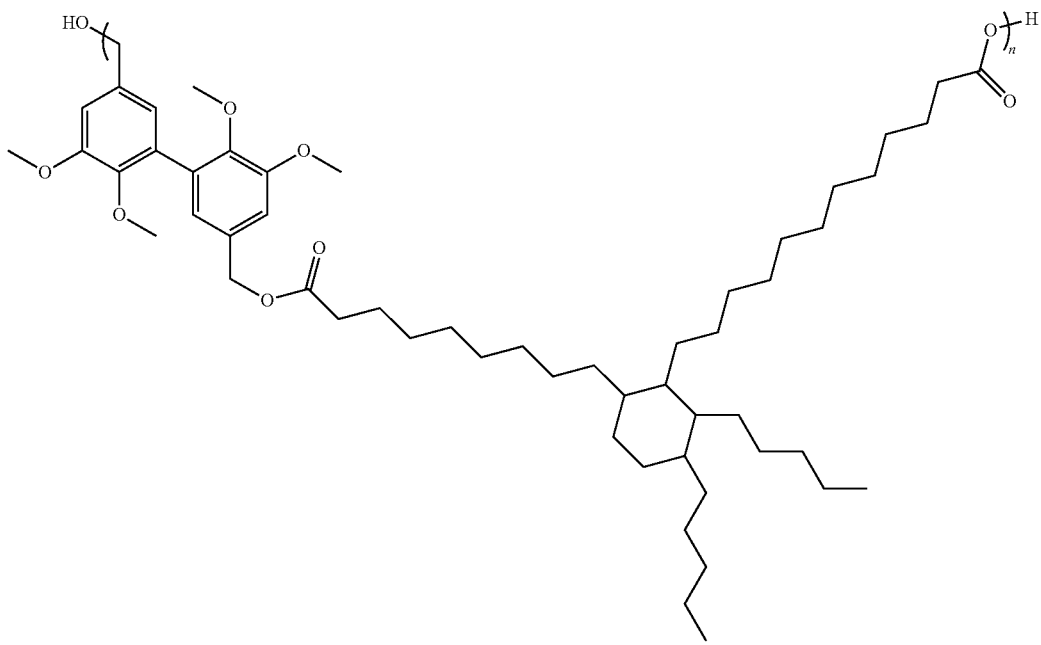

P2

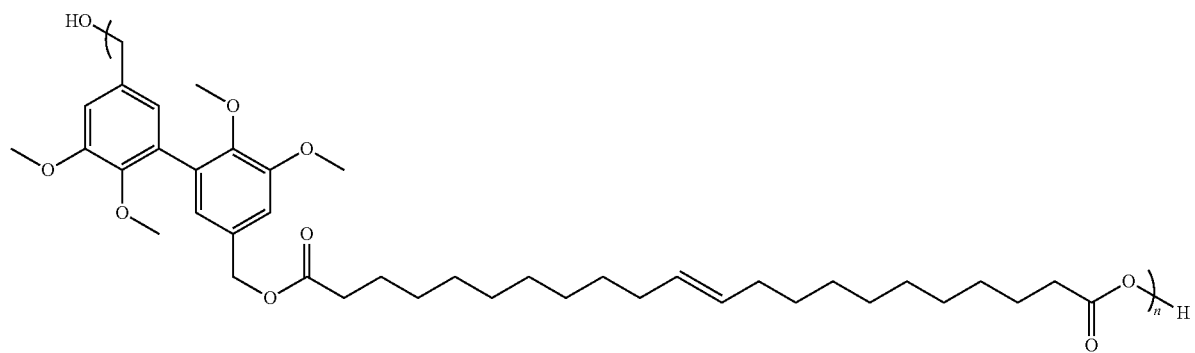
P3
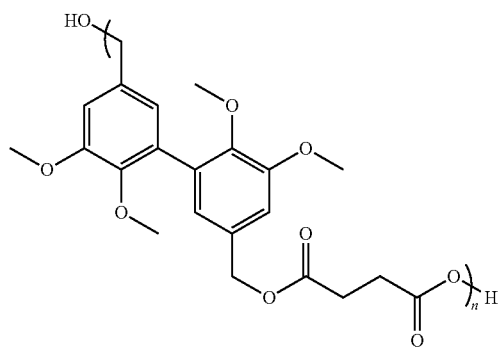
P4
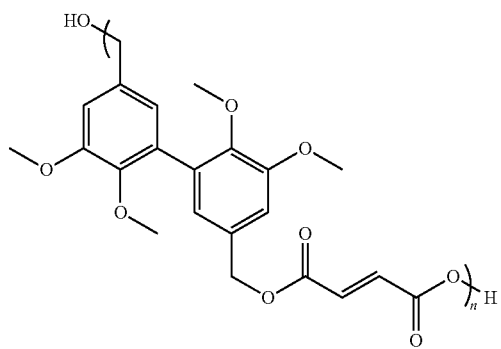
P5
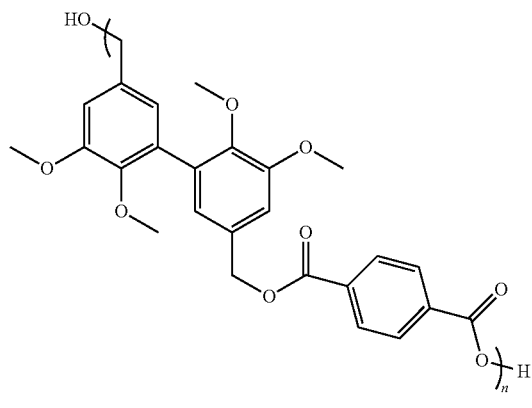
P6
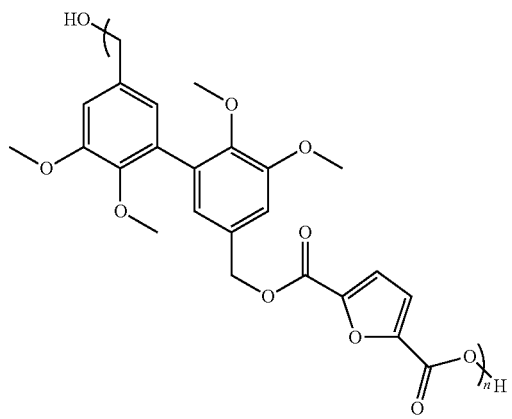
P7

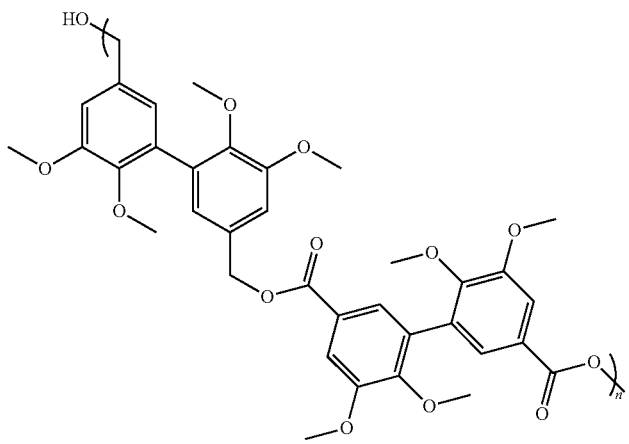

P8

P1 synthesis 0.5 g of methylated divanillyl diol (1.39 mmol) and 0.28 g of sebacid acid (1.39 mmol) were stirred at 160° C. for 2 h under nitrogen flow and at 200° C. under vacuum for 6 h in the presence of 2.4 mg of Titanium butoxide 0.5 mol %.

P2 Synthesis 0.5 g of methylated divanillyl diol (1.39 mmol) and 0.75 g of Pripol (1.39 mmol) were stirred at 160° C. for 2 h under nitrogen flow and at 200° C. under vacuum for 6 h in the presence of 2.4 mg of Titanium butoxide 0.5 mol %.

P3 Synthesis 0.5 g of methylated divanillyl diol (1.39 mmol) and 0.51 g of C22 diacid (1.39 mmol) were stirred at 160° C. for 2 h under nitrogen flow and at 200° C. under vacuum for 6 h in the presence of 2.4 mg of Titanium butoxide 0.5 mol %.

P4 Synthesis 0.5 g of methylated divanillyl diol (1.39 mmol) and 0.16 g of succinic acid (1.39 mmol) were stirred at 160° C. for 2 h under nitrogen flow and at 200° C. under vacuum for 6 h in the presence of 2.4 mg of Titanium butoxide 0.5 mol %.

P5 synthesis 0.5 g of methylated divanillyl diol (1.39 mmol) and 0.16 g of maleic acid (1.39 mmol) were stirred at 160° C. for 2 h under nitrogen flow and at 200° C. under vacuum for 6 h in the presence of 2.4 mg of Titanium butoxide 0.5 mol %.

P6 Synthesis 0.5 g of methylated divanillyl diol (1.39 mmol) and 0.23 g of terephtalic acid (1.39 mmol) were stirred at 160° C. for 2 h under nitrogen flow and at 200° C. under vacuum for 6 h in the presence of 2.4 mg of Titanium butoxide 0.5 mol %.

P7 Synthesis 0.5 g of methylated divanillyl diol (1.39 mmol) and 0.18 g of 2,5-furandicarboxylic acid (1.39 mmol) were stirred at 160° C. for 2 h under nitrogen flow and at 200° C. under vacuum for 6 h in the presence of 2.4 mg of Titanium butoxide 0.5 mol %.

TABLE 1

Thermomechanical properties of polymers from methylated divanillyl diol and different diacids

| Diol | Diacid | Catalyst | $T_g$ (° C.)[a] | TD5% (° C.)[b] | Polymer |
|---|---|---|---|---|---|
| (methylated divanillyl diol structure) | (sebacic acid structure) | TiOBu$_4$ 0, 5% | 19 | 297 | P1 |
| | (Pripol structure) | | −5 | 284 | P2 |
| | (C22 diacid structure) | | 13 | 260 | P3 |

TABLE 1-continued

Thermomechanical properties of polymers from methylated divanillyl diol and different diacids

| Diol | Diacid | Catalyst | $T_g$ (° C.)[a] | TD5% (° C.)[b] | Polymer |
|---|---|---|---|---|---|
| | succinic acid | | 90 | 270 | P4 |
| | fumaric acid | | 97 | 240 | P5 |
| | terephthalic acid | | 113 | 260 | P6 |
| | 2,5-furandicarboxylic acid | | 140 | 260 | P7 |

[a] $T_g$ (glass transition temperature) determined by DSC second heating cycle
[b] TD5% (Temperature of 5% degradation) determined by TGA.

Differential Scanning Calorimetry (DSC) measurements were performed on DSC Q100 (TA Instruments). The sample was heated from −70° C. to 200° C. at a rate of 10° C. min⁻¹. Consecutive cooling and second heating run were also performed at 10° C. min⁻¹. The glass transition temperatures (Tg) were calculated from the second heating run.

Thermogravimetric analyses (TGA) were performed on TGA-Q50 system from TA instruments at a heating rate of 10° C. min⁻¹ under air between 20° C. and 800° C. TD5%=Temperature at which 5% of the material is degraded.

Example 2: Preparation of Polyester P1 by Transesterification

General Procedures

Methylated divanillic diol (1 equivalent) and dimethyl sebacate (1 equivalent) were stirred at 160° C. for 2 h under nitrogen flow and at 200° C. under vacuum for 6 h in the presence of 2 mol % of catalyst (titanium butoxide, zinc acetate or dibutyltin oxide) or in the presence of 0.5 mol % of titanium butoxide.

According to another variant, methylated divanillic diol (1 equivalent) and dimethyl sebacate (1 equivalent) were stirred at 120° C. for 24 h in the presence of 10 mol % of TBD.

Polymers from Methylated Divanillyl Diol and Methyl Sebacate (P1) Using Different Catalysts (See Table 2 Below)

TBD10%

0.5 g of methylated divanillyl diol (1.39 mmol) and 0.32 g of dimethyl sebacate (1.39 mmol) were stirred at 120° C. for 24 h in the presence of 19.3 mg of TBD −5% mol per ester function)

TiOBu₄ 0.5%

0.5 g of methylated divanillyl diol (1.39 mmol) and 0.32 g of dimethyl sebacate (1.39 mmol) were stirred at 160° C. for 2 h under nitrogen flow and at 200° C. under vacuum for 6 h in the presence of 2.4 mg of Titanium butoxide (0.25 mol % catalyst relative per ester function).

TiOBu₄ 2%

0.5 g of methylated divanillyl diol (1.39 mmol) and 0.32 g of dimethyl sebacate (1.39 mmol) were stirred at 160° C. for 2 h under nitrogen flow and at 200° C. under vacuum for 6 h in the presence of 9.6 mg of Titanium butoxide (1 mol % catalyst relative per ester function).

ZnAc 2%

0.5 g of methylated divanillyl diol (1.39 mmol) and 0.32 g of dimethyl sebacate (1.39 mmol) were stirred at 160° C. for 2 h under nitrogen flow and at 200° C. under vacuum for 6 h in the presence of 6 mg of ZnAc (1 mol % catalyst relative per ester function).

DBTO 2%

0.5 g of methylated divanillyl diol (1.39 mmol) and 0.32 g of dimethyl sebacate (1.39 mmol) were stirred at 160° C. for 2 h under nitrogen flow and at 200° C. under vacuum for 6 h in the presence of 6.9 mg of DBTO (1 mol % catalyst relative per ester function).

TABLE 2

Properties of polymers from methylated divanillyl diol and methyl sebacate using different catalysts

| Diol | Methylsebacate (diester) | Catalyst (% by mol) | $T_g$ (° C.)[a] | TD5% (° C.)[c] | $\overline{M}_n$[b] (g/mol)[b] | Đ |
|---|---|---|---|---|---|---|
| (structure) | (structure) | TBD 10% | 14 | 299 | 33000 | 1.6 |
| | | TiOBu₄ 0, 5% | 34 | 319 | 65000 | 2.1 |
| | | TiOBu₄ 2% | 36 | 301 | 30000 | 2 |
| | | ZnAc 2% | 45 | 311 | 43000 | 1.8 |
| | | DBTO 2% | 25 | 319 | 44000 | 1.9 |

[a]determined by DSC second heating cycle
[b]determined by SEC in DMF/DMSO 80/20
[c]determined by TGA. (TD5%: Temperature of 5% degradation)

Size exclusion chromatography (SEC) analysis was performed at room temperature in DMF/DMSO using simultaneous UV and refraction index detections. The elution times were converted to molar mass using a calibration curve based on low dispersity ( Đ =$\overline{M}_n/\overline{M}_w$) polystyrene (PS) standards.

Differential Scanning Calorimetry (DSC) measurements were performed on DSC Q100 (TA Instruments). The sample was heated from −70° C. to 200° C. at a rate of 10° C. min⁻¹. Consecutive cooling and second heating run were also performed at 10° C. min⁻¹. The glass transition temperatures (Tg) were calculated from the second heating run.

Thermogravimetric analyses (TGA) were performed on TGA-Q50 system from TA instruments at a heating rate of 10° C. min-1 under air between 20° C. and 800° C. TD5%=Temperature of 5% degradation.

Example 3: Preparation of Polyester P9 by Transesterification

General Procedure

Methylated dimethyl vanillate (1 equivalent) and 1,10-decanediol (1 equivalent) were stirred at 160° C. for 2 h under nitrogen flow and at 200° C. under vacuum for 6 h in the presence of 2 mol % of catalyst (titanium butoxide, zinc acetate or dibutyltin oxide) or in the presence of 0.5 mol % of titanium butoxide.

According to another variant, methylated dimethyl vanillate (1 equivalent) and 1,10-decanediol (1 equivalent) were stirred at 120° C. for 24 h in the presence of 10 mol % of TBD.

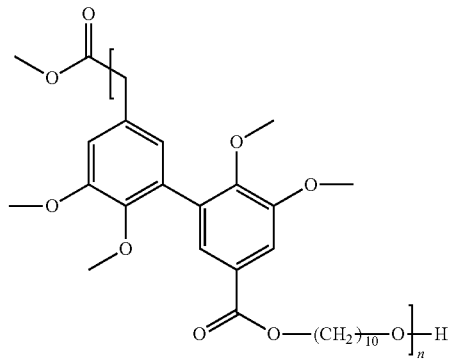

Polymers Obtained from Methylated Dimethylvanillate and Decanediol Using Different Catalysts TiOBu₄ 2%

0.5 g methylated dimethyldivanillate (1.28 mmol) and 0.23 g of 1,10-decanediol (1.28 mmol) were stirred at 160° C. for 2 h under nitrogen flow and at 200° C. under vacuum for 6 h in the presence of 8.7 mg of Titanium butoxide (1 mol % catalyst relative per ester function).

DBTO 2%

0.5 g methylated dimethyldivanillate (1.28 mmol) and 0.23 g of 1,10-decanediol (1.28 mmol) were stirred at 160° C. for 2 h under nitrogen flow and at 200° C. under vacuum for 6 h in the presence of 6.3 mg of DBTO (1 mol % catalyst relative per ester function).

TBD 10%

0.5 g methylated dimethyldivanillate (1.28 mmol) and 0.23 g of 1,10-decanediol (1.28 mmol) (1.39 mmol) were stirred at 120° C. for 24 h in the presence of 17.8 mg of TBD −5% mol per ester function)

ZnAc 2%

0.5 g methylated dimethyldivanillate (1.28 mmol) and 0.23 g of 1,10-decanediol (1.28 mmol) were stirred at 160°

C. for 2 h under nitrogen flow and at 200° C. under vacuum for 6 h in the presence of 4.7 mg of ZnAc (1 mol % catalyst relative per ester function).
TiOBu₄ 0.5%
0.5 g methylated dimethyldivanillate (1.28 mmol) and 0.23 g of 1,10-decanediol (1.28 mmol) were stirred at 160° C. for 2 h under nitrogen flow and at 200° C. under vacuum for 6 h in the presence of 2.2 mg of Titanium butoxide (0.25 mol % catalyst relative per ester function).

for 2 h under nitrogen flow and at 200° C. under vacuum for 6 h in the presence of 2.4 mg of Titanium butoxide (0.25 mol % catalyst relative per ester function).
P2 Synthesis
0.5 g of methylated divanillyl diol (1.39 mmol) and 0.79 g of Pripol ester (1.39 mmol) were stirred at 160° C. for 2 h under nitrogen flow and at 200° C. under vacuum for 6 h in the presence of 2.4 mg of Titanium butoxide (0.25 mol % catalyst relative per ester function).

TABLE 3

Properties of polymers obtained from methylated dimethylvanillate and decanediol using different catalysts

| Methylated dimethyldivanilate | Decanediol | Catalyst (mol %) | $T_g$ (°C)[a] | TD5% (°C)[c] | $\overline{M}_n$ (g/mol)[b] | Đ |
|---|---|---|---|---|---|---|
| [structure of methylated dimethyldivanillate] | HO~~~~~~~~~~OH | TiOBu₄ 2% | 38 | 273 | 11000 | 1.3 |
| | | DBTO 2% | 43 | 319 | 12000 | 1.6 |
| | | TBD 10% | 36 | 253 | 3000 | 1.2 |
| | | ZnAc 2% | 13 | 205 | 3000 | 1.0 |
| | | TiOBu₄ 0,5% | 32 | 300 | 20000 | 1.7 |

[a] determined by DSC second heating cycle
[b] determined by SEC in DMF/DMSO 80/20
[c] determined by TGA. Temperature of 5% degradation Differential Scanning Calorimetry (DSC) measurements were performed on DSC Q100 (TA Instruments). The sample was heated from −70° C. to 200° C. at a rate of 10° C. min⁻¹. Consecutive cooling and second heating run were also performed at 10° C. min⁻¹. The glass transition temperatures (Tg) were calculated from the second heating run.

Thermogravimetric analyses (TGA) were performed on TGA-Q50 system from TA instruments at a heating rate of 10° C. min⁻¹ under air between 20° C. and 800° C. TD5%=Temperature of 5% degradation.

Size exclusion chromatography (SEC) analysis was performed at room temperature in DMF/DMSO using simultaneous UV and refraction index detections. The elution times were converted to molar mass using a calibration curve based on low dispersity ($Đ = \overline{M}_n/\overline{M}_w$) polystyrene (PS) standards.

Example 4: Preparation of Polyester P1 to P'8 by Transesterification

The general procedure is identical to example 1.
The polymers P'1 to P'8 possess a structure similar to the one of polymers P1 to P8, except that the value of the repetitive units (n) differs, leading to polymers with various properties.

P'1 Synthesis
0.5 g of methylated divanillyl diol (1.39 mmol) and 0.32 g of dimethyl sebacate (1.39 mmol) were stirred at 160° C.

P'3 Synthesis
0.5 g of methylated divanillyl diol (1.39 mmol) and 0.54 g of C22 diester (1.39 mmol) were stirred at 160° C. for 2 h under nitrogen flow and at 200° C. under vacuum for 6 h in the presence of 2.4 mg of Titanium butoxide (0.25 mol % catalyst relative per ester function).

P'4 Synthesis
0.5 g of methylated divanillyl diol (1.39 mmol) and 0.20 g of dimethyl succinate (1.39 mmol) were stirred at 160° C. for 2 h under nitrogen flow and at 200° C. under vacuum for 6 h in the presence of 2.4 mg of Titanium butoxide (0.25 mol % catalyst relative per ester function).

P'6 Synthesis
0.5 g of methylated divanillyl diol (1.39 mmol) and 0.27 g of dimethyl terephtalate (1.39 mmol) were stirred at 160° C. for 2 h under nitrogen flow and at 200° C. under vacuum for 6 h in the presence of 2.4 mg of Titanium butoxide (0.25 mol % catalyst relative per ester function).

P'7 Synthesis
0.5 g of methylated divanillyl diol (1.39 mmol) and 0.26 g of 2,5-furandicarboxylic acid (1.39 mmol) were stirred at 160° C. for 2 h under nitrogen flow and at 200° C. under vacuum for 6 h in the presence of 2.4 mg of Titanium butoxide (0.25 mol % catalyst relative per ester function).

P'8 Synthesis
0.5 g of methylated divanillyl diol (1.39 mmol) and 0.54 g of methylated dimethyldivanillate (1.39 mmol) were stirred at 160° C. for 2 h under nitrogen flow and at 200° C. under vacuum for 6 h in the presence of 2.4 mg of Titanium butoxide (0.25 mol % catalyst relative per ester function).

TABLE 4

Thermomechanical properties of polymers from of methylated divanillyl diol and different methyldiesters (with catalyst TiOBu$_4$ 0.5%)

| Diester | T$_g$ (° C.)[a] | TD5% (° C.)[c] | E' (GPa)[b] | Polymers |
|---|---|---|---|---|
| methyl oleate-derived diester (C18 with internal C=C) dimethyl ester | 5 | 308 | 2.0 | P3' |
| dimethyl terephthalate | 101 | 310 | 2.0 | P6' |
| dimethyl succinate | 68 | 302 | 5.1 | P4' |
| dialkyl-substituted cyclohexane dimethyl diester | −5 | 347 | 0.1 | P2' |
| dimethyl furan-2,5-dicarboxylate | 140 | 342 | 1.4 | P7' |
| dimethyl sebacate | 38 | 319 | 8.1 | P1' |
| methylated biphenyl tetramethoxy diester | 102 | 305 | 1.3 | P8' |

[a]Determined by DSC second heating cycle
[b]Determined by DMA 3 points flexion
[c]Determined by TGA. Temperature of 5% degradation Differential Scanning Calorimetry (DSC) measurements were performed on DSC Q100 (TA Instruments). The sample was heated from −70° C. to 200° C. at a rate of 10° C. min$^{-1}$. Consecutive cooling and second heating run were also performed at 10° C. min$^{-1}$. The glass transition temperatures (Tg) were calculated from the second heating run.

Thermogravimetric analyses (TGA) were performed on TGA-Q50 system from TA instruments at a heating rate of 10° C. min$^{-1}$ under air between 20° C. and 800° C. TD5%=Temperature of 5% degradation.

The mechanical properties were measured with a dynamic mechanical thermal analyzer DMA RSA 3 (TA instrument). The sample temperature was modulated from −80° C. to 220° C., depending on the sample at a heating rate of 5° C./min. The measurements were performed in a 3-point bending mode at a frequency of 1 Hz, an initial static force varying between 0.1 and 0.5 N and a strain sweep of 0.1%.

Example 5: Preparation of Polyamides P10 to P12

General Procedure

Equimolar amount of diacids and diamines were dissolved in ethanol and the mixture was stirred slowly for 30 min at 80° C. to allow the formation of ammonium salt. The salt was obtained as a fine powder after elimination of the solvent and dried under vacuum. The salt was warmed at 230° C. for 4 h.

The following polyamides were synthesized:

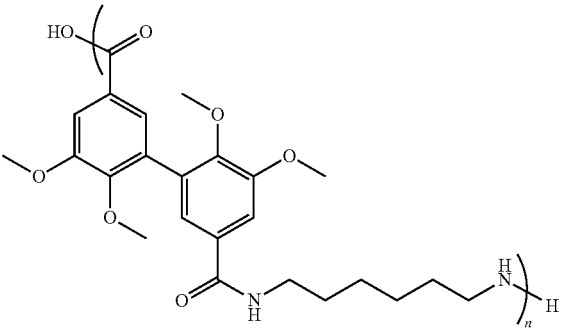

TABLE 5

Thermomechanical properties of polyamides synthesized from methylated divanillic diacid and different diamines

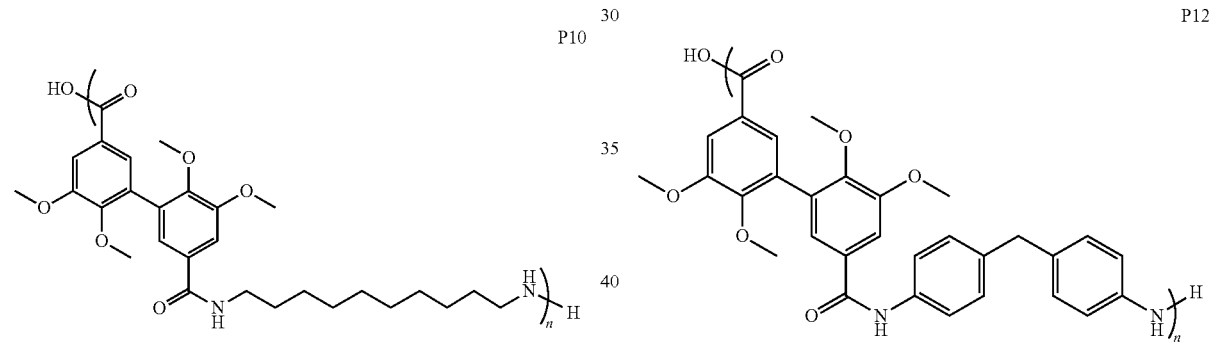

TABLE 5-continued

Thermomechanical properties of polyamides synthesized from methylated divanillic diacid and different diamines

| Diacid | Diamine | Tg (° C.)[a] | Name |
|---|---|---|---|
| | H$_2$N–C$_6$H$_4$–CH$_2$–C$_6$H$_4$–NH$_2$ | 157 | P12 |

[a]Determined by DSC second heating cycle

Differential Scanning Calorimetry (DSC) measurements were performed on DSC Q100 (TA Instruments). The sample was heated from −70° C. to 200° C. at a rate of 10° C. min$^{-1}$. Consecutive cooling and second heating run were also performed at 10° C. min$^{-1}$. The glass transition temperatures (Tg) were calculated from the second heating run.

Example 6: Preparation of Epoxy Resin Synthesis

General Procedure

Bisepoxide and diamine were mixed together in ethanol. After evaporation of the solvent the mixture is poured into a matrix and warmed at 80° C. for 4 h.

Differential Scanning Calorimetry (DSC) measurements were performed on DSC Q100 (TA Instruments). The sample was heated from −70° C. to 200° C. at a rate of 10° C. min$^{-1}$. Consecutive cooling and second heating run were also performed at 10° C. min$^{-1}$. The glass transition temperatures (Tg) were calculated from the second heating run.

Thermogravimetric analyses (TGA) were performed on TGA-Q50 system from TA instruments at a heating rate of

TABLE 6

Thermomechanical properties of Epoxy resins
Ratio Epoxy group/H of amine = 1

| Bisepoxy | Diamine | Tα (° C.)[a] | Tg[b] (° C.) | E' (GPa) 25° C.[b] | TD5% (° C.) | TD30% (° C.) |
|---|---|---|---|---|---|---|
| (diglycidyl ether of methylated divanillic structure) | (isophorone diamine with two NH$_2$ groups) | 112 | 126 | 1.1 | 312 | 337 |

[a]obtained from DMA

[b]obtained from DSC

DMA RSA 3 (TA instrument). The sample temperature was modulated from −80° C. to 220° C., depending on the sample at a heating rate of 5° C./min. The measurements were performed in a 3-point bending mode at a frequency of 1 Hz, an initial static force varying between 0.1 and 0.5 N and a strain sweep of 0.1%.

10° C. min$^{-1}$ under air between 20° C. and 800° C. TD5%=Temperature of 5% degradation.

Example 7: Preparation of Unsaturated Polyesters

General Procedure

Unsaturated dimer (0.22 mmol) was dissolved in 1 mL of Polarclean. Grubbs catalyst (2% mol) was added to the flask.

The flask was heated at 80° C. under vacuum for 18 h. Then 1 mL of ethyl vinyl ether was introduced to the flask to quench the reaction. The final polymer was diffolved into 1 mL of THF and reprecipitated in cold methanol.

The following polymers were synthesized:

P14

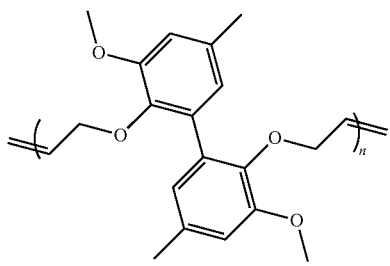

P15

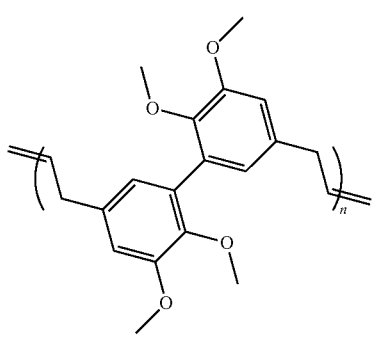

P16

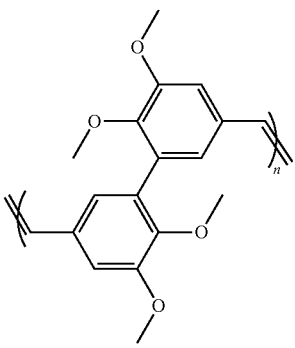

P17

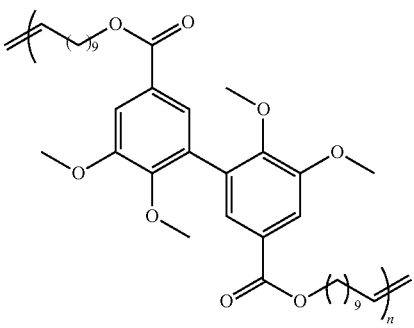

TABLE 7

Thermomechanical properties of polyesters by ADMET resins

| Monomer | Catalyst | $\overline{M}_n$ (g/mol) | Đ | $T_g$ (° C.)[a] | TD5% (° C.) | Polymer |
|---|---|---|---|---|---|---|
| (structure) | HG1 | 7000 | 1.1 | 17 | 250 | P14 |
| (structure) | HG2 | 40000 | 1.7 | 50.4 | 330 | P15 |

TABLE 7-continued
Thermomechanical properties of polyesters by ADMET resins
| Monomer | Catalyst | $\overline{M}_n$ (g/mol) | Đ | $T_g$ (°C.)[a] | TD5% (°C.) | Polymer |
|---|---|---|---|---|---|---|
| | HG2 | 29000 | 1.7 | 160 | 380 | P16 |
| | HG2 | 10000 | 1.6 | 4.0 | 310 | P17 |
The catalysts mentioned in table 7 are the following:
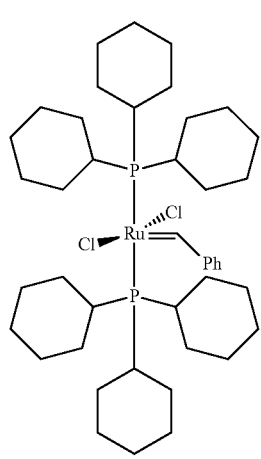
Grubbs 1st generation catalyst
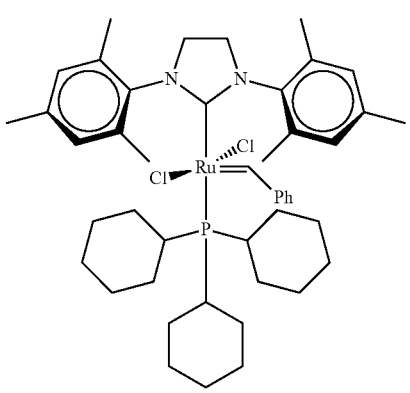
Grubbs 2nd generation catalyst

49

-continued

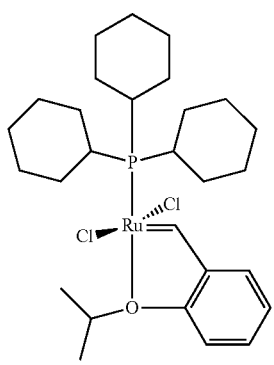

Hoveyda-Grubbs 1st generation catalyst

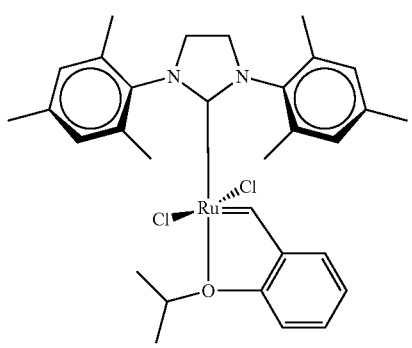

Hoveyda-Grubbs 2nd generation catalyst

Differential Scanning Calorimetry (DSC) measurements were performed on DSC Q100 (TA Instruments). The sample was heated from −70° C. to 200° C. at a rate of 10° C. min$^{-1}$. Consecutive cooling and second heating run were also performed at 10° C. min$^{-1}$. The glass transition temperatures (Tg) were calculated from the second heating run.

Thermogravimetric analyses (TGA) were performed on TGA-Q50 system from TA instruments at a heating rate of 10° C. min$^{-1}$ under air between 20° C. and 800° C. TD5%=Temperature of 5% degradation.

Size exclusion chromatography (SEC) analysis was performed at room temperature in DMF/DMSO using simultaneous UV and refraction index detections. The elution times were converted to molar mass using a calibration curve based on low dispersity ($Đ = \overline{M}_n/\overline{M}_w$) polystyrene (PS) standards.

Example 8: Preparation of Polyimines

The polyimines of formula (XII) as mentioned above are prepared by reacting divanilline with a diamine.

The monomers are mixed in stoichiometric amounts in the presence of a solvent (toluene, CH$_3$Cl) (5 mg/mL). The mixture of the monomers in the solvent is heated at reflux for 3 days in a Dean-Stark apparatus.

50

Then, the polymer thus obtained is washed with methanol and fractionated with a Soxhlet extractor.

The following reaction is carried out:

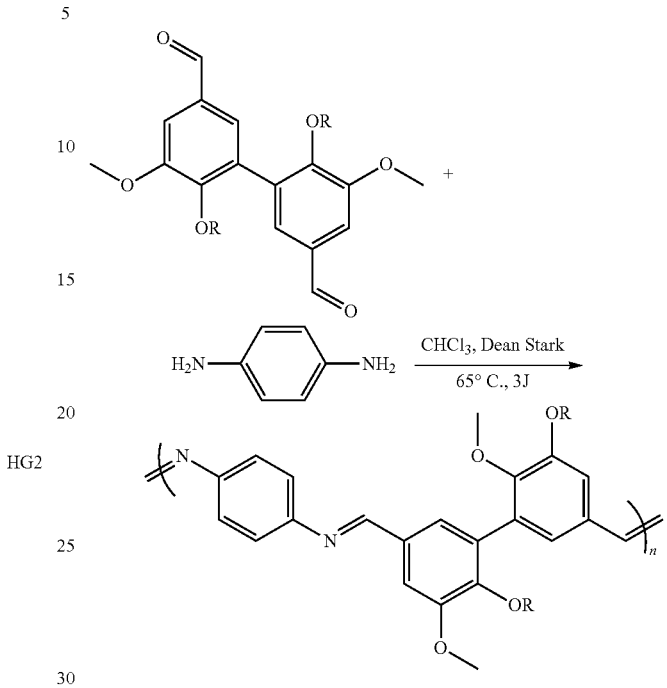

R being H.

The polymer thus obtained has a Mn of 3 525 g·mol$^{-1}$ and Đ=1.4.

The same method could be carried out by using microwaves.

The invention claimed is:

1. A process for the preparation of a polymer, comprising a step of polymerizing a compound having the following formula (I):

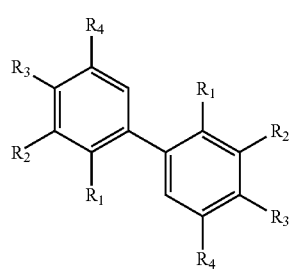

(I)

wherein:
R$_1$ is H or a OR$_7$ group, R$_7$ being H, a (C$_1$-C$_{10}$)alkyl group or a (C$_2$-C$_6$)alkenyl group;
R$_2$ is a (C$_1$-C$_6$)alkoxy group;
R$_3$ is H or a radical of formula (II)

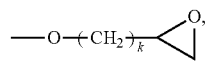

k being an integer varying from 1 to 6;

$R_4$ is a $(C_1-C_6)$alkoxy group or a radical X chosen from the group consisting of: $(C_2-C_6)$alkenyl groups, $(C_1-C_{10})$alkyl group, —CHO, —COOH, —CH$_2$OH, and —COOR$_a$, R$_a$ being a $(C_1-C_6)$alkyl group or a $(C_2-C_{12})$alkenyl group;

and wherein:
when $R_1$ is H, then $R_3$ is a group of formula (II) and $R_4$ is a $(C_1-C_6)$alkoxy group, and
when $R_1$ is a OR$_7$ group, then $R_3$ is H and $R_4$ is X as defined above.

2. A compound susceptible to be obtained by polymerization of the compound of formula (I) as defined in claim 1, and of a monomer chosen from the group consisting of: diacids, diesters, diamines, and epoxy compounds.

3. A compound susceptible to be obtained by polymerization of the compound of formula (I) as defined in claim 1, comprising at least one repetitive unit U, wherein said unit U comprises a moiety having the following formula (III):

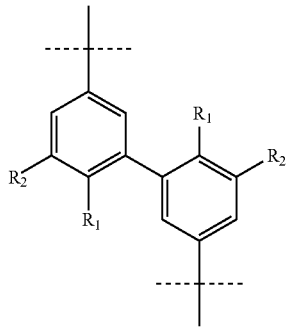

(III)

wherein:
$R_1$ represents OR$_7$ group, R$_7$ being H or a $(C_1-C_{10})$alkyl group;
$R_2$ represents a $(C_1-C_6)$alkoxy group.

4. The compound of claim 2, having the following formula (IV):

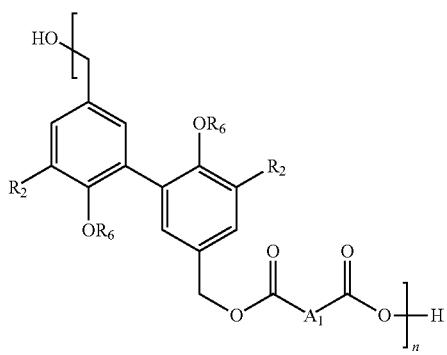

(IV)

wherein:
$A_1$ is chosen from the group consisting of:
a $(C_2-C_{10})$alkylene radical;
a $(C_3-C_{12})$cycloalkylene radical, optionally substituted by at least one $(C_1-C_{10})$alkyl group;
a $(C_2-C_{30})$alkenylene radical;
an arylene radical comprising from 6 to 14 carbon atoms, optionally substituted in ortho, meta or para with a $(C_1-C_{10})$alkyl group;
a heteroarylene radical comprising from 5 to 14 carbon atoms and at least one heteroatom chosen from O, S and N, optionally substituted in ortho, meta or para with a $(C_1-C_{10})$alkyl group; and
a radical of formula —B$_1$—B$_2$—B$_3$— wherein:
B$_2$ is a $(C_3-C_{12})$cycloalkylene radical, in which one or more carbon atom(s) is optionally substituted by at least one $(C_1-C_{10})$alkyl group, and
B$_1$ and B$_3$, identical or different, are chosen from the $(C_2-C_{15})$alkylene radicals;
a radical of formula —B$_4$—B$_5$—, wherein B$_4$ and B$_5$, identical or different, are chosen from the arylene radicals comprising from 6 to 14 carbon atoms, optionally substituted in ortho, meta or para with one or several substituents chosen from the $(C_1-C_6)$ alkoxy groups;
$R_2$ is a $(C_1-C_6)$alkoxy group;
$R_6$ is $(C_1-C_6)$alkyl group; and
n is an integer varying from 1 to 130.

5. A process for preparing a compound according to claim 4, comprising at least one step of polymerization of:
a compound having the following formula (I-1):

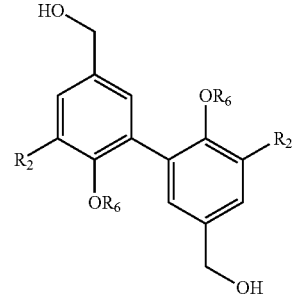

(I-1)

wherein $R_2$ and $R_6$ are as defined in claim 4,
and a compound of formula (V) R$_b$OOC-A$_1$-COOR$_b$, wherein A$_1$ is as defined in claim 4, and R$_b$ is H or a $(C_1-C_6)$alkyl group.

6. The process of claim 5, wherein the polymerization step is carried out in the presence of a catalyst chosen from the group consisting of: 5,7-triazabicyclo[4.4.0]dec-5-ene (TBD), zinc acetate (ZnAc), Ti(OBu)$_4$, dibutyl tin oxide (DBTO), and mixtures thereof.

7. The compound of claim 2, having the following formula (IV-bis):

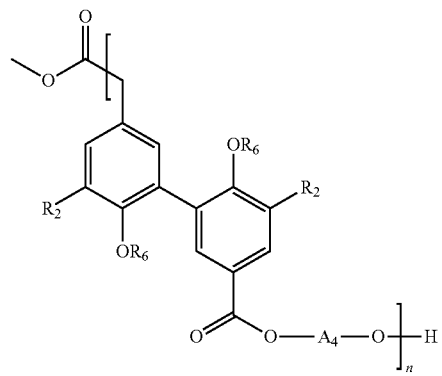

(IV-bis)

wherein:

A$_4$ is a (C$_2$-C$_{10}$)alkylene radical;

R$_2$ is a (C$_1$-C$_6$)alkoxy group;

R$_6$ is (C$_1$-C$_6$)alkyl group; and n is an integer varying from 1 to 40.

8. A process for preparing a compound according to claim 7, comprising at least one step of polymerization of:

a compound having the following formula (I-2):

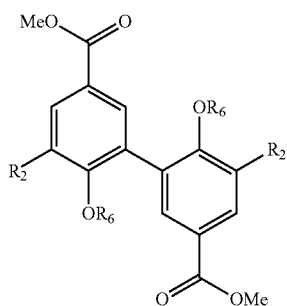

(I-2)

wherein R$_2$ and R$_6$ are as defined in claim 7, and a compound of formula (VIII):

HO-A$_4$-OH          (VIII)

wherein A$_4$ is as defined in claim 7.

9. The process of claim 8, wherein the polymerization step is carried out in the presence of a catalyst chosen from the group consisting of: 5,7-triazabicyclo[4.4.0]dec-5-ene (TBD), zinc acetate (ZnAc), Ti(OBu)$_4$, dibutyl tin oxide (DBTO), and mixtures thereof.

10. The compound of claim 2, having the following formula (VI):

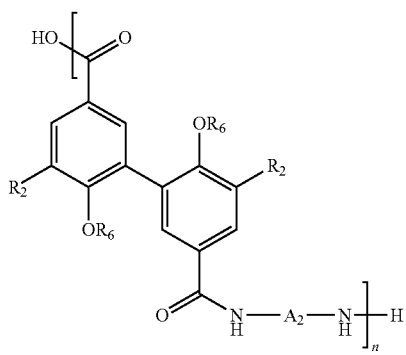

(VI)

wherein:

A$_2$ is chosen from the group consisting of:
- a (C$_2$-C$_{10}$)alkylene radical;
- a (C$_3$-C$_{12}$)cycloalkylene radical, optionally substituted by at least one (C$_1$-C$_{10}$)alkyl group;
- a (C$_2$-C$_{30}$)alkenylene radical;
- an arylene radical comprising from 6 to 14 carbon atoms, optionally substituted in ortho, meta or para with a (C$_1$-C$_{10}$)alkyl group;
- a heteroarylene radical comprising from 5 to 14 carbon atoms and at least one heteroatom chosen from O, S, and N, optionally substituted in ortho, meta or para with a (C$_1$-C$_{10}$)alkyl group; and
- a radical of formula —B'$_1$—B'$_2$—B'$_3$— wherein:
  - B'$_2$ is a (C$_1$-C$_{10}$)alkylene radical, and
  - B'$_1$ and B'$_3$, identical or different, are chosen from the arylene radicals comprising from 6 to 14 carbon atoms, optionally substituted in ortho, meta or para with a (C$_1$-C$_{10}$)alkyl group;

R$_2$ is a (C$_1$-C$_6$)alkoxy group;

R$_6$ is (C$_1$-C$_6$)alkyl group; and n is an integer varying from 1 to 100.

11. A process for preparing a compound according to claim 10, comprising at least one step of polymerization of:

a compound having the following formula (I-3):

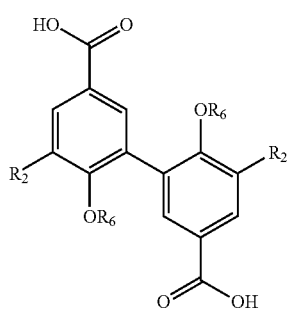

(I-3)

wherein R$_2$ and R$_6$ are as defined in claim 10, and a diamine of formula (VII) H$_2$N-A$_2$-NH$_2$, A$_2$ being as defined in claim 10.

12. A process for preparing a compound according to claim 2, comprising at least one step of polymerization of:

a compound having the following formula (I-4):

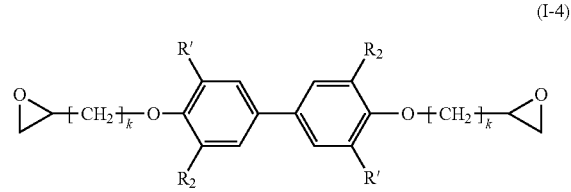

(I-4)

wherein:

R$_2$ is a (C$_1$-C$_6$)alkoxy group, k is an integer varying from 1 to 6,

R' being a (C$_1$-C$_6$)alkoxy group;

and a diamine of formula (X) H$_2$N-A$_3$-NH$_2$, A$_3$ being a radical of formula —B"$_1$—B"$_2$— wherein:

B"$_1$ is a (C$_3$-C$_{12}$)cycloalkylene radical, in which one or more carbon atom(s) is optionally substituted by at least one (C$_1$-C$_{10}$)alkyl group, and B"$_2$ is a (C$_1$-C$_{10}$)alkylene radical.

13. The compound of claim 3, having the following formula (XI-A) or (XI-B):

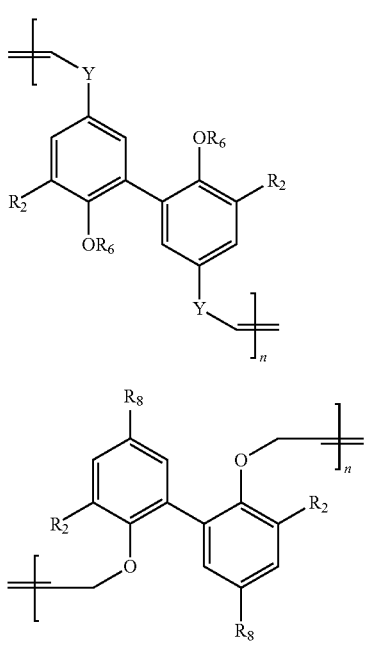

wherein:
R$_2$ is a (C$_1$-C$_6$)alkoxy group;
R$_6$ is a (C$_1$-C$_{10}$)alkyl group,
Y is chosen from the group consisting of: a bond, a (C$_1$-C$_{10}$)alkylene radical, a radical —C(O)O—R$_c$— and —R$_c$—O(O)C—, R$_c$ being a (C$_1$-C$_{10}$)alkylene radical;
R$_8$ is a (C$_1$-C$_6$)alkoxy group or a (C$_1$-C$_{10}$)alkyl group; and
n is an integer varying from 10 to 120.

14. A process for preparing a compound according to claim 13, comprising at least one step of polymerization of a compound having the following formula (I-5):

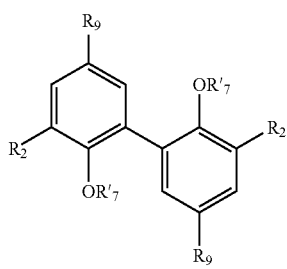

wherein:
R$_2$ is as defined in claim 13;
R'$_7$ is chosen from the group consisting of: (C$_1$-C$_{10}$) alkyl groups and (C$_2$-C$_6$)alkenyl groups, and
R$_9$ is chosen from the group consisting of: (C$_1$-C$_{10}$) alkyl groups, (C$_2$-C$_6$)alkenyl groups, and —COOR$_a$ groups, R$_a$ being a (C$_2$-C$_{12}$)alkenyl group, wherein, when R$_7$ is an alkyl group, then R$_9$ is chosen from the (C$_2$-C$_6$)alkenyl groups and —COOR$_a$ groups, and when R$_7$ is an alkenyl group, then R$_9$ is an alkyl group.

15. The process of claim 14, wherein the polymerization step is carried out in the presence of a Grubbs catalyst.

16. The compound of claim 2, having the following formula (XII):

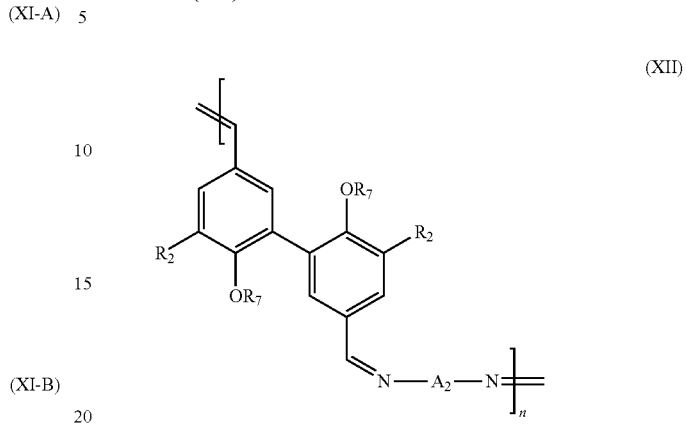

wherein:
A$_2$ is chosen from the group consisting of:
a (C$_2$-C$_{10}$)alkylene radical;
a (C$_3$-C$_{12}$)cycloalkylene radical, optionally substituted by at least one (C$_1$-C$_{10}$)alkyl group;
a (C$_2$-C$_{30}$)alkenylene radical;
an arylene radical comprising from 6 to 14 carbon atoms, optionally substituted in ortho, meta or para with a (C$_1$-C$_{10}$)alkyl group;
a heteroarylene radical comprising from 5 to 14 carbon atoms and at least one heteroatom chosen from O, S, and N, optionally substituted in ortho, meta or para with a (C$_1$-C$_{10}$)alkyl group; and
a radical of formula —B'$_1$—B'$_2$—B'$_3$— wherein:
B'$_2$ is a (C$_1$-C$_{10}$)alkylene radical, and
B'$_1$ and B'$_3$, identical or different, are chosen from the arylene radicals comprising from 6 to 14 carbon atoms, optionally substituted in ortho, meta or para with a (C$_1$-C$_{10}$)alkyl group;
R$_2$ is a (C$_1$-C$_6$)alkoxy group;
R$_7$ is H, a (C$_1$-C$_{10}$)alkyl group or a (C$_2$-C$_6$)alkenyl group; and
n is an integer varying from 1 to 100.

17. A process for preparing a compound according to claim 16, comprising at least one step of polymerization of:
a compound having the following formula (I-6):

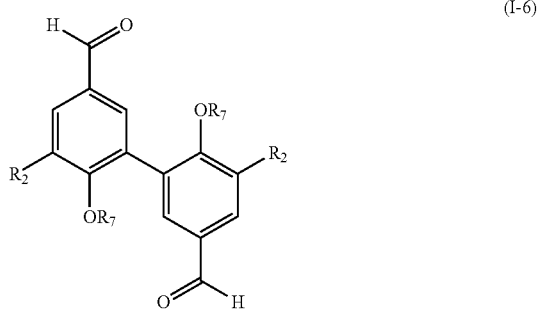

wherein R$_2$ and R$_7$ are as defined in claim 16,
and a diamine of formula (VII) H$_2$N-A$_2$-NH$_2$, A$_2$ being as defined in claim 16.

* * * * *